United States Patent
Hayakawa et al.

(10) Patent No.: US 8,655,549 B2
(45) Date of Patent: Feb. 18, 2014

(54) VEHICLE DRIVING CONTROL APPARATUS AND VEHICLE DRIVING CONTROL METHOD

(75) Inventors: Yasuhisa Hayakawa, Yokohama (JP); Masahiro Kobayashi, Atsugi (JP); Ko Sato, Atsugi (JP); Shuhei Nishimaki, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 815 days.

(21) Appl. No.: 12/497,787

(22) Filed: Jul. 6, 2009

(65) Prior Publication Data

US 2010/0030430 A1    Feb. 4, 2010

(30) Foreign Application Priority Data

Jul. 29, 2008 (JP) ................................. 2008-194862
Apr. 24, 2009 (JP) ................................. 2009-106502

(51) Int. Cl.
*B62D 6/00* (2006.01)
(52) U.S. Cl.
USPC .................. 701/42; 701/28; 701/36; 701/41; 701/45; 701/48; 701/116; 701/523; 701/300
(58) Field of Classification Search
None
See application file for complete search history.

(56) References Cited

U.S. PATENT DOCUMENTS

| | | | |
|---|---|---|---|
| 3,760,827 A | | 9/1973 | Weber |
| 5,483,453 A | * | 1/1996 | Uemura et al. ................. 701/23 |
| 5,555,312 A | * | 9/1996 | Shima et al. .................. 382/104 |
| 6,057,754 A | * | 5/2000 | Kinoshita et al. ............. 340/435 |
| 6,138,062 A | | 10/2000 | Usami |
| 6,185,492 B1 | * | 2/2001 | Kagawa et al. ................. 701/41 |
| 6,282,478 B1 | | 8/2001 | Akita |
| 6,970,787 B2 | * | 11/2005 | Matsumoto et al. .......... 701/301 |
| 7,117,076 B2 | * | 10/2006 | Shimakage et al. ............. 701/41 |
| 7,216,023 B2 | * | 5/2007 | Akita ............................... 701/41 |
| 7,236,870 B2 | * | 6/2007 | Tange et al. ..................... 701/70 |
| 7,509,211 B2 | * | 3/2009 | Niwa et al. .................... 701/417 |

(Continued)

FOREIGN PATENT DOCUMENTS

| | | |
|---|---|---|
| EP | 1 304 607 A1 | 4/2003 |
| EP | 1 867 542 A1 | 12/2007 |

(Continued)

OTHER PUBLICATIONS

The extended European Search Report of corresponding European Application No. 09008642.2-1523, dated Nov. 27, 2009.

(Continued)

*Primary Examiner* — Jonathan M Dager
(74) *Attorney, Agent, or Firm* — Global IP Counselors, LLP

(57) ABSTRACT

A vehicle driving control apparatus is provided with a lane detecting device, a future position estimating device and a vehicle control device. The lane detecting device detects a lane marker of a lane. The future position estimating device estimates a future transverse position of a host vehicle after a prescribed amount of time. The vehicle control device executes a vehicle control such that a yaw moment is imparted to the host vehicle toward a middle of the lane. The yaw moment is imparted upon determining that the future transverse position is positioned laterally farther toward an outside of the lane from the middle of the lane than a prescribed widthwise lane position that is determined in advance using the lane marker as a reference. The vehicle control device suppresses an impartation of the yaw moment device when a recognition degree of the lane marker is lower than a prescribed value.

19 Claims, 11 Drawing Sheets

(56) References Cited

U.S. PATENT DOCUMENTS

| | | | |
|---|---|---|---|
| 7,844,384 B2* | 11/2010 | Seto | 701/96 |
| 2002/0080019 A1* | 6/2002 | Satoh et al. | 340/436 |
| 2003/0045982 A1* | 3/2003 | Kondo et al. | 701/41 |
| 2003/0097206 A1 | 5/2003 | Matsumoto et al. | |
| 2004/0098197 A1* | 5/2004 | Matsumoto et al. | 701/301 |
| 2004/0143381 A1* | 7/2004 | Regensburger et al. | 701/36 |
| 2004/0153228 A1 | 8/2004 | Matsumoto et al. | |
| 2004/0183663 A1 | 9/2004 | Shimakage | |
| 2004/0186650 A1* | 9/2004 | Tange et al. | 701/96 |
| 2004/0215393 A1* | 10/2004 | Matsumoto et al. | 701/300 |
| 2004/0230375 A1* | 11/2004 | Matsumoto et al. | 701/301 |
| 2005/0125125 A1 | 6/2005 | Matsumoto et al. | |
| 2005/0125153 A1* | 6/2005 | Matsumoto et al. | 701/300 |
| 2005/0200467 A1* | 9/2005 | Au et al. | 340/465 |
| 2005/0228588 A1* | 10/2005 | Braeuchle et al. | 701/301 |
| 2005/0273264 A1 | 12/2005 | Gern et al. | |
| 2006/0142921 A1 | 6/2006 | Takeda | |
| 2006/0145827 A1* | 7/2006 | Kuge et al. | 340/439 |
| 2007/0032914 A1* | 2/2007 | Kondoh et al. | 701/1 |
| 2007/0233386 A1* | 10/2007 | Saito et al. | 701/300 |
| 2008/0208409 A1* | 8/2008 | Matsumoto et al. | 701/41 |
| 2009/0009305 A1* | 1/2009 | Kataoka et al. | 340/435 |
| 2010/0023218 A1* | 1/2010 | Hayakawa et al. | 701/42 |
| 2010/0318263 A1* | 12/2010 | Hayakawa et al. | 701/41 |
| 2012/0166017 A1* | 6/2012 | Kobayashi et al. | 701/1 |

FOREIGN PATENT DOCUMENTS

| | | |
|---|---|---|
| JP | H08-253160 | 10/1996 |
| JP | 11-096496 | 4/1999 |
| JP | 2000-025631 | 1/2000 |
| JP | 2002-002427 | 1/2002 |
| JP | 2003-025937 | 1/2003 |
| JP | 2003-040132 | 2/2003 |
| JP | 2003-104091 | 4/2003 |
| JP | 2003-154910 | 5/2003 |
| JP | 2004-243904 | 9/2004 |
| JP | 2004-268845 | 9/2004 |
| JP | 2004-326355 | 11/2004 |
| JP | 2005-182407 | 7/2005 |
| JP | 2006-182129 | 7/2006 |
| JP | 2006-206032 | 8/2006 |
| JP | 2007-030851 | 2/2007 |
| JP | 2007-076508 | 3/2007 |
| JP | 2008-044546 | 2/2008 |
| WO | WO-2007/0145564 A1 | 12/2007 |

OTHER PUBLICATIONS

Japanese Office Action of corresponding Japanese Patent Application No. 2009-106502, dated on Feb. 26, 2013.

The extended European Search Report of corresponding European Patent Application No. 12004130.6-1503, dated Apr. 4, 2013.

The extended European Search Report of corresponding European Patent Application No. 12004131.4-1503, dated Apr. 4, 2013.

The extended European Search Report of corresponding European Patent Application No. 12004132.2-1503, dated Apr. 4, 2013.

* cited by examiner

VEHICLE DRIVING CONTROL APPARATUS AND VEHICLE DRIVING CONTROL METHOD

CROSS-REFERENCE TO RELATED APPLICATIONS

This application claims priority to Japanese Patent Application Nos. 2008-194862, filed on Jul. 29, 2008, and 2009-106502, filed on Apr. 24, 2009. The entire disclosures of Japanese Patent Application Nos. 2008-194862 and 2009-106502 are hereby incorporated herein by reference.

BACKGROUND OF THE INVENTION

1. Field of the Invention

The present application generally relates to a vehicle driving control apparatus and vehicle driving control method. More specifically, the present invention relates to a vehicle driving control that controls an appropriate lateral control to assist a driver's driving even when a recognition degree of a lane marker is low.

2. Background Information

An example of a conventional apparatus technology serving to control a vehicle is presented in Japanese Laid-Open Patent Publication No. 08-253160. The apparatus determines if a steering operation occurs when a vehicle speed exceeds a predetermined vehicle speed. It then detects a distance from the vehicle to an obstacle existing in a region located laterally of the vehicle in a direction corresponding to a direction of the steering operation. If the distance to the obstacle is within a predetermined distance, a control is executed to prevent the driver from steering toward the obstacle. In this way, the driver can be warned that the vehicle is laterally approaching the obstacle.

Additionally, when the vehicle speed is equal to or below a set vehicle speed, either the steering suppression control is not started or it is canceled if it is already in progress. In this way, when it is estimated that the vehicle is traveling through a curve, the steering suppression control is prevented and the vehicle is prevented from, for example, running off the road.

In view of the above, it will be apparent to those skilled in the art from this disclosure that there exists a need for an improved vehicle driving control apparatus and vehicle driving control method. The present application addresses this need in the art as well as other needs which will become apparent to those skilled in the art from this disclosure.

SUMMARY OF THE INVENTION

It has been discovered that with the conventional technology described above, there are some driving situations in which there is a possibility that the lateral obstacle avoidance control will intervene more readily than is necessary when a lane marker is not detected, e.g., when a lane marker is worn and difficult to recognize or when a lane marker is interrupted and does not exist. Such unnecessary execution and termination of the lateral obstacle avoidance control can cause a driver to feel that something is odd about the vehicle.

The inventions of the present application were conceived in view of this issue. One object is to provide a vehicle driving control apparatus that is configured to execute an appropriate lateral obstacle avoidance control to assist a driver's driving even when a recognition degree of a lane marker is low.

In order to achieve the object stated above, a vehicle driving control apparatus is provided that basically comprises a lane detecting device, a future position estimating device and a vehicle control device. The lane detecting device is configured to detect a lane marker of a lane in which a host vehicle equipped with the vehicle control apparatus is traveling. The future position estimating device is configured to estimate a future transverse position of the host vehicle after a prescribed amount of time. The vehicle control device is configured to execute a vehicle control with respect to the host vehicle such that a yaw moment oriented toward a middle of the lane in which the host vehicle is traveling is imparted to the host vehicle. The yaw moment is imparted when the vehicle control device determines that the future transverse position of the host vehicle estimated by the future position estimating device is positioned laterally farther toward an outside of the lane from the middle of the lane than a prescribed widthwise lane position. The prescribed widthwise lane position is determined in advance using the lane marker as a reference. The vehicle control device is further configured to suppress an impartation of the yaw moment by the vehicle control device. This suppression is executed when a recognition degree at which the lane detecting device detects the lane marker is lower than a prescribed value.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
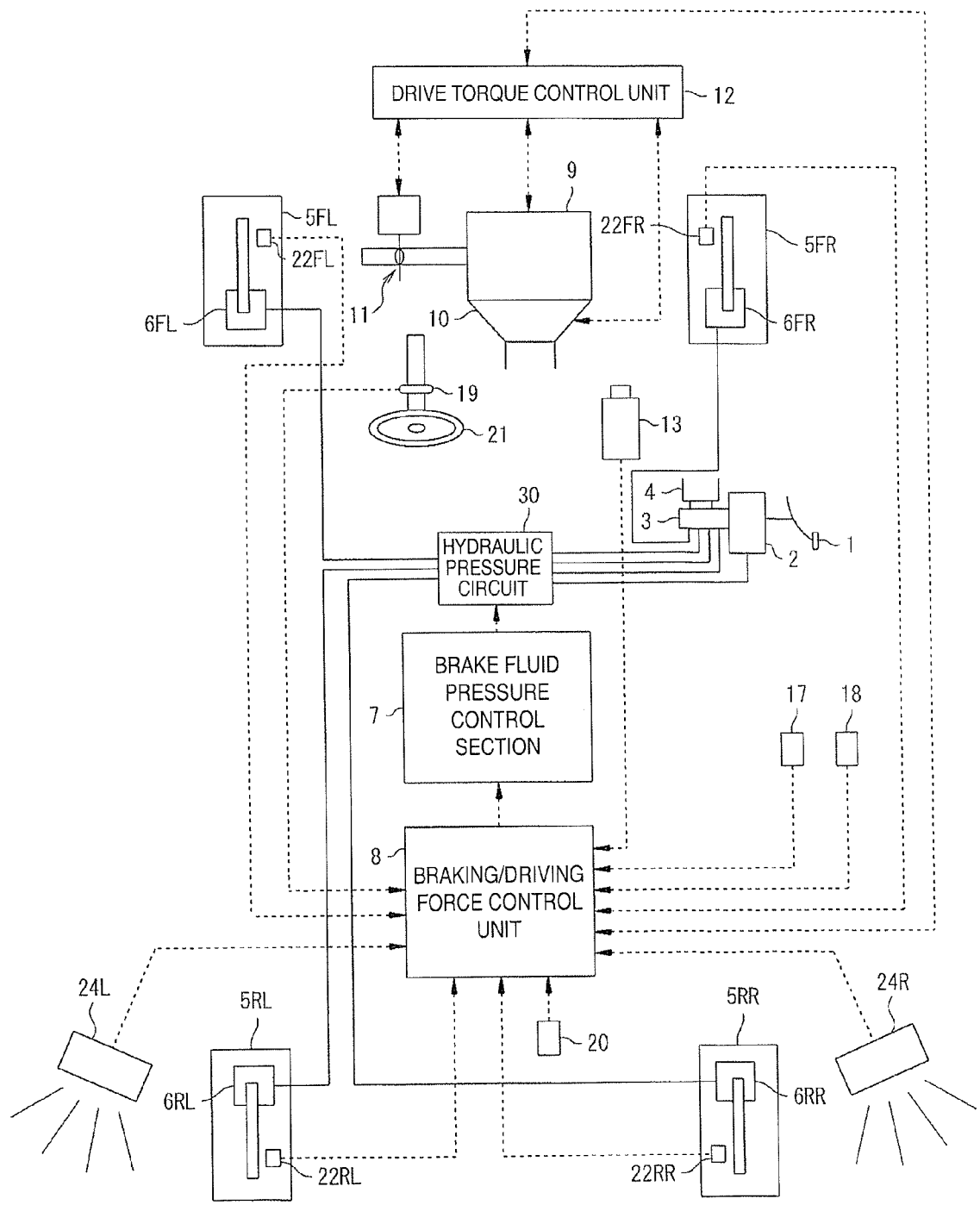
FIG. 1 is a schematic view of a vehicle driving control apparatus in accordance with a first embodiment.

Referring initially to FIG. 1, a vehicle driving (lateral obstacle avoidance) control apparatus is illustrated in accordance with a first embodiment. This embodiment exemplifies a case in which the vehicle driving control apparatus is installed in a host vehicle with rear wheel drive. It would also be acceptable if the vehicle were a front wheel drive vehicle or a four wheel drive vehicle. The host vehicle has an automatic transmission and a differential gear. The host vehicle is also installed with a brake apparatus that can independently control the respective braking forces of the wheels, between front and rear wheels and between left and right wheels.

The host vehicle is provided with a braking system including, among other things, a brake pedal 1, a booster 2, a master cylinder 3 and a reservoir 4. The brake pedal 1 is connected to the master cylinder 3 through the booster 2. The host vehicle also has wheels 5FL to 5RR that are provided with wheel cylinders 6FL to 6RR, respectively. The master cylinder 3 is connected to each of the wheel cylinders 6FL to 6RR of the wheels 5FL to 5RR through a hydraulic pressure circuit 30. Thus, when braking control is not operating, the master cylinder 3 increases the brake fluid pressure in response to an amount by which the brake pedal 1 is depressed by the driver. The increased brake fluid pressure is transmitted through the hydraulic pressure circuit 30 and supplied to the wheel cylinders 6FL to 6RR of the wheels 5FL to 5RR.

A brake fluid pressure control section 7 controls actuators in the hydraulic pressure circuit 30 so as to control the brake fluid pressure of each of the wheel cylinders 6FL to 6RR of the wheels 5FL to 5RR separately. The brake fluid pressure supplied to each of the wheel cylinders 6FL to 6RR of the wheels 5FL to 5RR is controlled to a value corresponding to a command value from a braking/driving force control unit 8. The actuators are, for example, proportional solenoids arranged such that they can control a reduction pressure of each of the wheel cylinders to any desired brake fluid pressure.

A brake fluid pressure control section 7 used in an anti-skid control system (ABS), a traction control system (TCS), or a vehicle dynamic control system (VDC) can be used to realize the brake fluid pressure control section 7 and the hydraulic pressure circuit 30. The brake fluid pressure control section 7 can also be configured to control the brake fluid pressure of each of the wheel cylinders 6FL to 6RR separately and independently. In such a case, when a brake fluid pressure command value is issued from the braking/driving force control unit 8 (described later), the brake fluid pressure of each of the wheel cylinders 6FL to 6RR of the wheels 5FL to 5RR is controlled according to the brake fluid pressure command value.

A drive torque control unit 12 is provided in the vehicle. The drive torque control unit 12 controls a drive torque imparted to the drive wheels, i.e., the rear wheels 5RL and 5RR. The drive torque control is accomplished by controlling an operating state of an engine 9, a selected gear ratio of the automatic transmission 10, and an opening degree of a throttle valve 11. In other words, the drive torque control unit 12 controls a fuel injection quantity and an ignition timing while simultaneously controlling a throttle opening degree. In this way, the operating state of the engine 9 is controlled.

The drive torque control unit 12 sends a drive torque value Tw to the braking/driving force control unit 8 (vehicle control device) as control information. The drive torque control unit 12 can also control the drive torques of the rear wheels 5RL and 5RR independently. However, when a drive torque command value is received from the braking/driving force control unit 8, the drive torque control unit 12 controls the torques of the drive wheels 5RL and 5RR in accordance with the drive torque command value.

An imaging section 13 having an image processing function is provided on a front portion of the host vehicle. The imaging section 13 is used to detect a position of the host vehicle within a lane in which it is traveling. The imaging section 13 is a monocular camera, e.g., a CCD (charged coupled device) camera. The imaging section 13 photographs or records images of a region in front of the host vehicle. The imaging section 13 then applies an image processing to the photographed image in order to detect a lane marker (e.g., a white line dividing the lanes), and thus detect the lane in which the vehicle is traveling based on the detected lane marker.

Based on the detected traveling lane, the imaging section 13 calculates a yaw angle $\phi$ front between a longitudinal axis of the host vehicle and the lane marker of the traveling lane, a transverse displacement amount Xfront with respect to the traveling lane and a curvature amount $\beta$ of the traveling lane. The imaging section 13 then sends the calculated yaw angle $\phi$ front, the transverse displacement amount Xfront and the lane curvature amount $\beta$ to the braking/driving force control unit 8.

If a lane marker cannot be detected, the imaging section 13 sends a signal indicating that a lane marker could not be detected to the braking/driving force control unit 8. The imaging section 13 also sends information indicating a detection recognition degree to the braking/driving control unit 8 in accordance with an accuracy of a captured image. Even if the image quality (recognition degree) of a captured image is equal to or above a prescribed level, there are times when a lane marker cannot be detected, such as when the vehicle is near a toll booth where there are no lane markers.

The imaging section 13 detects the lane marker and calculates the yaw angle $\phi$ front based on the detected lane maker. Thus, the yaw angle $\phi$ front is greatly affected by the accuracy with which the imaging section 13 detects the lane marker.

The host vehicle is provided with a pair of radar devices 24L and 24R. The radar devices 24L and 24R serve as sensors for detecting obstacles traveling (located) on the left and right sides, respectively, of the vehicle. Each of the radar devices 24L and 24R is set such that it can detect if an obstacle exists within the region located laterally of the vehicle, this region including at least a prescribed blind spot area. Preferably, a relative transverse position POSXobst, a relative longitudinal position DISTobst, and a relative longitudinal velocity dDISTobst of the vehicle can be detected with respect to an obstacle on the left or right side of the host vehicle.

The host vehicle is provided with a master cylinder pressure sensor 17, an accelerator position sensor 18, a steering angle sensor 19, a turn signal switch 20, and wheel speed sensors 22FL to 22RR. The master cylinder pressure sensor 17 serves to detect an output pressure of the master cylinder 3, i.e., a master cylinder fluid pressure Pm. The accelerator position sensor 18 serves to detect a depression amount of an accelerator pedal, i.e., an accelerator position $\theta t$. The steering angle sensor 19 serves to detect a steering angle of the steering wheel 21. The turn signal switch 20 serves to detect a turning direction indicating operation of a turn signal device. Each of the wheel speed sensors 22FL to 22RR serve to detect a rotational speed, called a wheel speed Vwi (i=fl, fr, rl, rr), of a respective wheel 5FL to 5RR. Each of these sensors 22FL to 22RR sends a signal indicating a detected value to the braking/driving force control unit 8.

Figure 2:
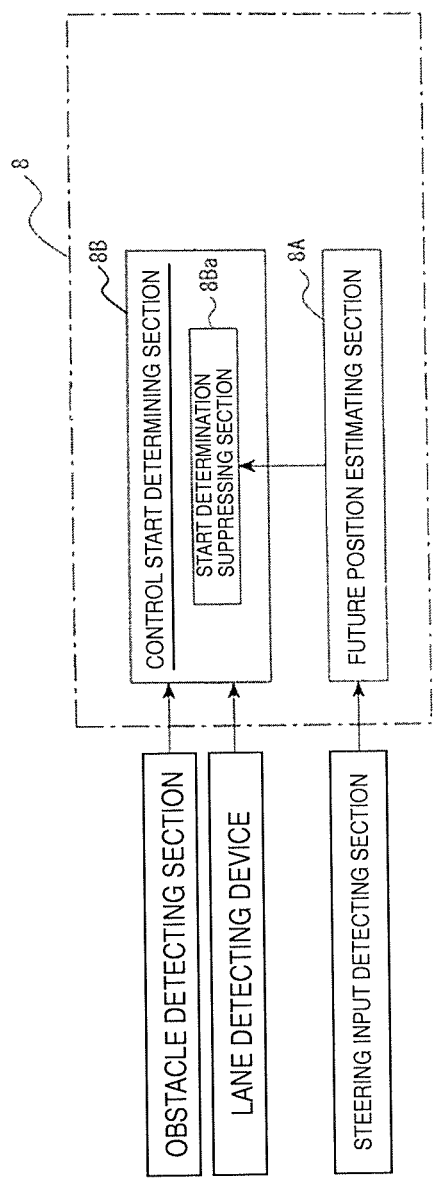
FIG. 2 is a block diagram showing constituent features of a control unit of the vehicle driving control apparatus in accordance with the first embodiment.

As shown in FIG. 2, the braking/driving force control unit 8 includes a future position estimating section 8A and an avoidance control start determining section 8B. The control avoidance control start determining section 8B includes a start determination suppressing section 8Ba. The braking/driving force control unit 8 is operatively coupled to the braking system. With this embodiment of the braking/driving force control unit 8, when the lane marker cannot be detected or a recognition degree thereof is low, impartation of a yaw moment by the aforementioned lateral obstacle avoidance control is suppressed. As a result, a necessary lateral obstacle avoidance control can be executed while preventing unnecessary starting and ending of the lateral obstacle avoidance control and preventing a driver from experiencing a feeling that something is odd about the host vehicle.

The braking/driving force control unit 8 preferably includes a microcomputer with a braking/driving force control program that controls the braking system as discussed above. The braking/driving force control unit 8 can also include other conventional components such as an input interface circuit, an output interface circuit, and storage devices such as a ROM (Read Only Memory) device and a RAM (Random Access Memory) device. The microcomputer of the braking/driving force control unit 8 is programmed to control the braking system. The memory circuit stores processing results and control programs that are run by the processor circuit. The internal RAM of the braking/driving force control unit 8 stores statuses of operational flags and various control data. The internal ROM of the braking/driving force control unit 8 stores the programs for controlling various operations relating to the control of the braking/driving force. It will be apparent to those skilled in the art from this disclosure that the precise structure and algorithms for the braking/driving force control unit 8 can be any combination of hardware and software that will carry out the functions of the vehicle driving control apparatus.

Based on a steering input from a driver, the future position estimating section 8A estimates a future position where the host vehicle MM will be after a prescribed amount of time, i.e., a future viewing time Tt, which is set in advance. The future viewing time Tt is used as a reference point in time for the host vehicle at which the avoidance control start determining section 8B will determine whether or not to start avoidance control. A first prescribed time Tt0 is set as a default value of the future viewing time Tt and used as a reference. The control avoidance control start determining section 8B is configured to determine that a lateral obstacle avoidance control should be started upon determining that an obstacle is detected laterally of the vehicle and a future position (future transverse position) of the vehicle estimated by the future position estimating section 8A is at a transverse position (prescribed lane-width direction position) corresponding to an obstacle distance X2obst determined using a lane marker located on a side closer to the obstacle as a reference or at a transverse position that is farther in a direction of the obstacle than the obstacle distance X2obst. The expression "farther in a direction of the obstacle than a transverse position corresponding to the obstacle distance X2obst" means that the future transverse position of the vehicle is located farther toward the outside of the lane from a middle of the lane than a transverse position corresponding to the obstacle distance X2obst. When the control avoidance control start determining section 8B determines that the lateral obstacle avoidance control should be started, the braking/driving force control unit 8 calculates a yaw moment Ms to be used to control the vehicle such that the vehicle is prevented from approaching the obstacle (i.e., such that a yaw moment oriented toward the middle of the lane is generated).

If control avoidance control start determining section 8B determines that a lane marker cannot be detected or that a recognition degree is low, then the start determination suppressing section 8Ba sets the future viewing time Tt to a value shorter than a value used when a lane marker is detected, i.e., shorter than the future viewing time Tt0 set in advance as a default value. In other words, shortening the future viewing time Tt causes the control to intervene less readily, i.e., suppresses the likelihood that a need to start the control will be determined.

Figure 3:
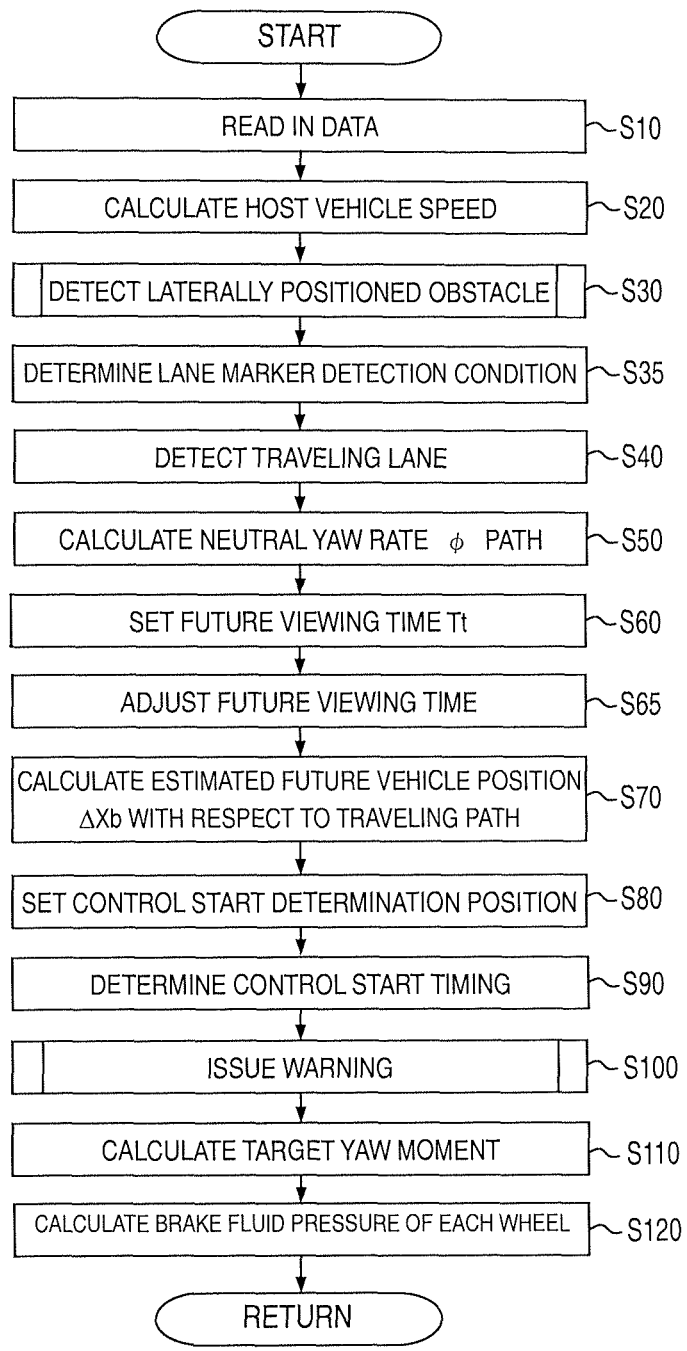
FIG. 3 is a flowchart showing control steps executed by the control unit in accordance with the first embodiment.

The processing executed by braking/driving force control unit 8 will now be explained with reference to FIG. 3. The braking/driving force control unit 8 executes the processing with a timer interrupt each time a prescribed sampling time (control cycle time) $\Delta T$ (e.g., 10 msec) elapses. Although the processing shown in FIG. 3 does not include communication processing, information acquired from computational processing steps is consecutively updated in a storage device and necessary information is read from the storage device as needed.

In step S10, the braking/driving force control unit 8 reads various data from the aforementioned sensors, controllers, and control units. More specifically, it acquires wheel speeds Vwi (including four wheel speeds corresponding to the front and rear wheels, Vwrl, Vwrr, Vwfl, Vwfr), a steering angle $\delta$, and a master cylinder fluid pressure Pm detected by the sensors, as well as a turn signal switch signal. In step S20, the braking/driving force control unit 8 calculates a vehicle speed V. The vehicle speed V is calculated using one of the equations (1) shown below, depending on which wheels are the drive wheels.

$$V=(Vwrl+Vwrr)/2 \text{ (for front wheel drive)};$$

$$V=(Vwfl+Vwfr)/2 \text{ (for rear wheel drive)} \quad (1)$$

In the equations (1), Vwfl is the wheel speed of the left front wheel and Vwfr is the wheel speed of the right front wheel. Similarly, Vwrl is the wheel speed of the left rear wheel and Vwrr is the wheel speed of the right rear wheel. The equations (1) calculate the vehicle speed V as the average value of the wheel speeds of the non-drive wheels. In this embodiment, the vehicle speed V is calculated based on the wheel speeds of the front wheels (i.e., the latter equation) because the vehicle is a rear wheel drive vehicle. When a separate automatic braking control system, e.g., an ABS (anti-lock brake system), is operating, an estimated vehicle body speed estimated by the separate braking control system is acquired and used as the vehicle speed V.

Figure 4:
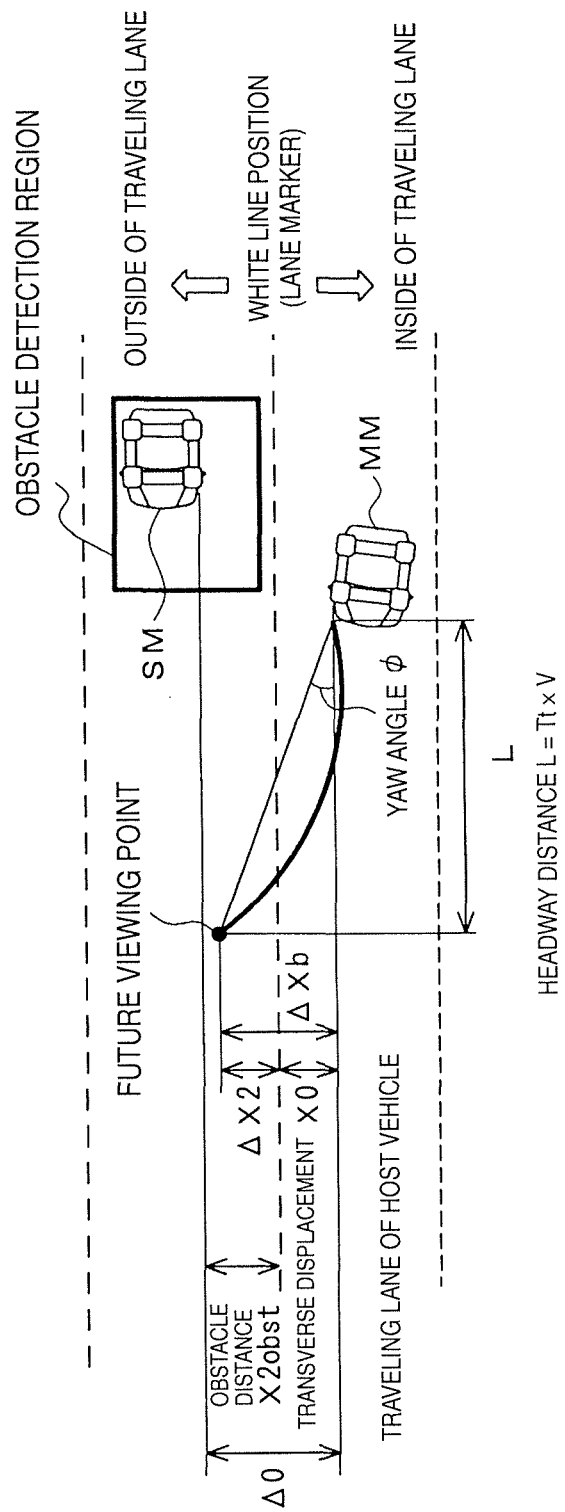
FIG. 4 is a conceptual diagram illustrating a relationship between a host vehicle employing the vehicle driving control apparatus and an obstacle (e.g., another vehicle)

In step S30, the braking/driving force control unit 8 determines the existence Lobst (i.e., existence or nonexistence) of an obstacle SM in a region laterally leftward of the host vehicle MM and the existence Robst (i.e., existence or nonexistence) of an obstacle SM in a region laterally rightward of the host vehicle MM. If more accurate sensors are used, then a relative position and relative velocity of obstacle(s) SM with respect to the host vehicle MM can be obtained. As shown in FIG. 4, a lateral region of the host vehicle MM in which an obstacle is detected includes positions diagonally rearward of the host vehicle MM.

In step S35, the braking/driving force control unit 8 determines a condition regarding detection of a line marker. In other words, based on the recognition information from the imaging section 13, the braking/driving force control unit 8 determines if left and right lane markers are detected and sets a lane marker flag CAMLOSTright and CAMLOSTleft. The lane marker flags CAMLOSTright and CAMLOSTleft serve as information regarding a right-side lane marker and a left-side lane marker, respectively. The lane marker flags CAMLOSTright and CAMLOSTleft are set to "0" when the corresponding lane marker is detected normally and set to "1" when the corresponding lane marker cannot be detected. Meanwhile, the flags are set to "2" when the recognition degree is lower than normal. The recognition degree is deemed to be lower than normal when the lane marker can be detected but the detection accuracy is low.

When a left and/or right lane marker cannot be detected, an amount of time that the inability to detect the lane marker has continued is counted separately for the left and right lane markers. These continuation times are called a lost time LTr and lost time TLl. When a lane marker is detected, the corresponding lost time is cleared to "0."

In step S40, from the imaging section 13, the braking/driving force control unit 8 reads a current transverse displacement (transverse position) Xfront of the host vehicle MM with respect to the lane in which the vehicle is traveling (traveling lane) and a curvature βfront of the lane in which it is traveling from the imaging section 13. The curvature βfront of the traveling lane does not necessarily have to be acquired from the imaging section 13. For example, it is acceptable to acquire curvature information recorded in a navigation system corresponding to the current position of the vehicle. The braking/driving force control unit 8 calculates a yaw angle φ front of the host vehicle MM with respect to the lane in which it is traveling. The yaw angle φ front is used to detect a traveling state within the lane. In this embodiment, a value measured by the imaging section 13 is used as the yaw angle φ front.

However, when the lane marker flags CAMLOSTright and CAMLOSTleft indicate that a steering-side lane marker cannot be detected, the yaw angle φ front is calculated based on the lane marker that was detected immediately prior. For example, the yaw angle φ front can be calculated based on a lane marker in an area photographed by the imaging section 13. In such a case, the yaw angle φ front can be calculated, for example, using the equation (2) shown below based on a transverse displacement Xfront of the host vehicle MM. It is also acceptable to calculate the yaw angle φ front in the same manner even when the lane marker is detected.

$$\phi\text{front} = \tan^{-1}(dX'/V(=dX/dY)) \quad (2)$$

The components of the equation are as follows:
dX: change amount per time unit of the transverse displacement Xfront.
dY: change amount per time unit of a moving direction, and
dX': differential value of the change amount dX.

When the yaw angle φ front is calculated based on a nearby lane marker, the calculation of the yaw angle φ front is not limited to using the lateral displacement Xfront as shown in the equation (2) above. For example, it is acceptable to extend the detected lane marker to a far point and calculate the yaw angle φ front based on the extended lane marker. When a lane marker cannot be detected, the yaw angle φ front should be detected using this processing.

In step S50, the braking/driving force control unit 8 calculates a neutral yaw rate φ'path. When the lane marker flags CAMLOSTright and CAMLOSTleft indicate that a steering-side lane marker can be detected, the neutral yaw rate φ'path is calculated using the equation (3) below.

$$\phi'\text{path} = \beta\text{front} \times V \quad (3)$$

The neutral yaw rate φ'path is a yaw rate necessary for the host vehicle MM to maintain its travel along the lane in which it is traveling. The neutral yaw rate φ'path is zero when the vehicle is traveling along a straight path, but the neutral yaw rate φ'path changes depending on the curvature βfront when the road is curved. Therefore, the curvature βfront of the lane in which the vehicle is traveling is used when calculating the neutral yaw rate φ'path.

To obtain a neutral yaw rate φ'path for maintaining the path along which the vehicle is traveling, it is also acceptable to use an average value φ'ave of a yaw rate φ' over a prescribed period of time or to perform a simple calculation of a value obtained by applying a filter having a large time constant to a yaw rate φ'.

Meanwhile, if the lane marker flags CAMLOSTright and CAMLOSTleft indicate that the steering-side lane marker cannot be detected, then the neutral yaw rate φ'path is set to "0" because the neutral yaw rate φ'path cannot be estimated accurately when the lane marker is not detected. Setting the neutral yaw rate φ'path to "0" is equivalent to assuming the vehicle is traveling along a straight path.

When the lost time of the lane marker on the steering side is within a prescribed amount of time, a neutral yaw rate φ'path obtained immediately before the lane marker became undetectable (i.e., the neutral yaw rate φ'path is not "0") and a steering direction is oriented toward an outside of a curve, it is acceptable to use the neutral yaw rate φ'path obtained immediately before the lane marker became undetectable as the current neutral yaw rate φ'path. It is also acceptable to use an average value φ'ave of a yaw rate φ' over a prescribed period of time or to apply a filter having a large time constant to the yaw rate φ' in order to calculate the neutral yaw rate φ'path.

In step S60, the braking/driving force control unit 8 sets a future viewing time Tt. As shown in the expression Tt→Tt0, a preset future viewing time Tt0 is set as the value of the future viewing time Tt. The future viewing time Tt is an amount of time used to determine a threshold value for estimating a future proximity situation between the host vehicle MM having the braking/driving force control unit 8 and an obstacle SM. In other words, the future viewing time Tt indicates a point in time at which the avoidance control start determination section 8B will determine whether or not to start avoidance control. The future viewing time Tt0 is set to, for example, 1 second.

The braking/driving force control unit 8 also calculates a target yaw rate Ψdriver and a target yaw rate Ψdriverhosei. The target yaw rate Ψdriver is calculated based on a steering angle δ and a vehicle speed V using the equation Ψdriver=Kv×δ×V. The target yaw rate Ψdriver is a target yaw rate generated in response to the steering. Kv is indicative of a gain value, as explained further below. The target yaw rate Ψdriver is a target yaw rate generated in response to the steering. Kv is indicative of a gain value, as explained further below.

The target yaw rate Ψdriverhosei is calculated with the equation (4) shown below. The target yaw rate Ψdriverhosei is a value obtained by subtracting the yaw rate φ' path necessary to travel in the traveling lane from the target yaw rate Ψdriver. In this way, the effect of any steering performed in order to drive through a curve is eliminated.

$$\Psi\text{driverhose}i = \Psi\text{driver} - \phi'\text{path} \quad (4)$$

In step S65, the braking/driving force control unit 8 adjusts the future viewing time Tt. The adjustment processing applied to the future viewing time Tt is selected according to the values of the lane marker flags CAMLOSTright and CAMLOSTleft.

When the values of the lane marker flags CAMLOSTright and CAMLOSTleft are equal to zero (0), the lane marker flags CAMLOSTright and CAMLOSTleft indicate that the lane markers are being detected normally. If the lane marker flags CAMLOSTright and CAMLOSTleft indicate that the lane markers are being detected normally, then the braking/driving force control unit 8 proceeds directly to step S70, without adjusting the future viewing time Tt.

Figure 5:
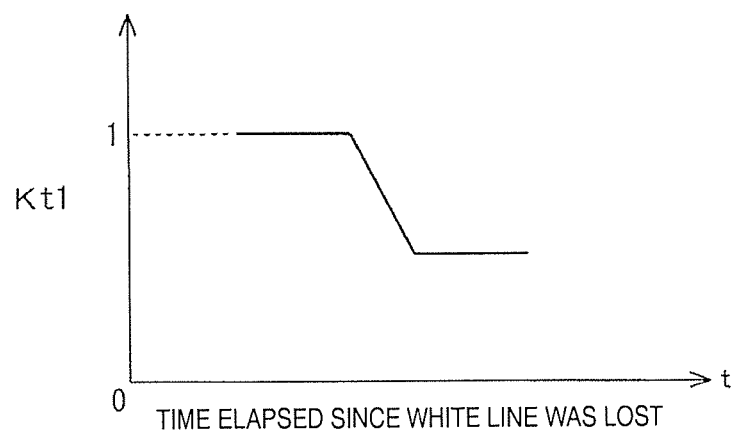
FIG. 5 is a graph illustrating an example characteristic of a lost gain Kt1 over time.

When the values of the lane marker flags CAMLOSTright and CAMLOSTleft are equal to one (1), the lane marker flags CAMLOSTright and CAMLOSTleft indicate that the lane markers are not being detected. If the lane marker flags CAMLOSTright and CAMLOSTleft indicate that the lane markers are not being detected, then the braking/driving force control unit 8 sets a first lost gain Kt1 based on a map like that shown in FIG. 5. As the lost time (time a lost state has continued since a lane marker became undetectable) becomes longer, the value to which the first lost gain Kt1 is set becomes smaller. With the map shown in FIG. 5, the lost gain Kt1 is set to 1 (a first prescribed value) until the lost time reaches a first prescribed amount of time. After, the first prescribed amount of time has lapsed, the value of the lost gain Kt1 decreases as the lost time increases until the lost time reaches a second prescribed amount of time. After, the second prescribed amount of time has lapsed, the value of the lost gain Kt1 is set to a second prescribed value.

Figure 6:
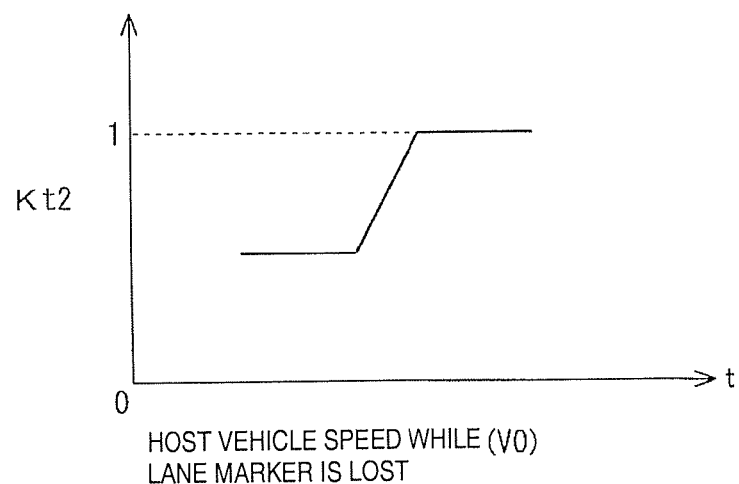
FIG. 6 is a graph illustrating an example characteristic of a lost gain Kt2 with respect to the velocity of the host vehicle.

In the first control cycle in which the braking/driving force control unit 8 determines that a lane marker cannot be detected, the braking/driving force control unit 8 sets a second lost gain Kt2 based on a map like that shown in FIG. 6. If a vehicle speed V0 corresponding to when the lane marker became undetectable is equal to or smaller than a prescribed vehicle speed, then the second lost gain Kt2 is set such that when the vehicle speed is the smaller, the second lost gain Kt2 becomes smaller until the vehicle speed falls below a prescribed vehicle speed (e.g., FIG. 6).

Thus, when the values of the lane marker flags CAMLOSTright and CAMLOSTleft are equal to one (1), the future viewing time Tt is then adjusted using the following equation: Tt→Tt×Kt1×Kt2. Then, after adjusting the future viewing time Tt, the braking/driving force control unit 8 proceeds to step S70.

Figure 7:
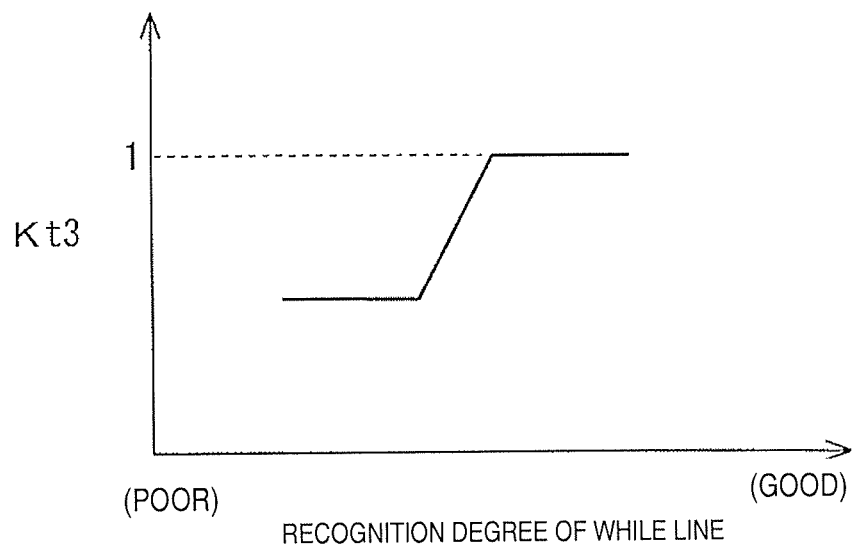
FIG. 7 is a graph illustrating an example characteristic of a lost gain Kt3 over time.

When the values of the lane marker flags CAMLOSTright and CAMLOSTleft are equal to two (2), the lane markers are being detected but the recognition degree is low. When the lane marker flags CAMLOSTright and CAMLOSTleft indicate that the lane markers are being detected but the recognition degree is low, a third lost gain Kt3 is set based on a recognition degree KD, as shown in FIG. 7. That is, as the recognition degree becomes lower, the value that is set as the third lost gain Kt3 becomes smaller.

Thus, when the values of the lane marker flags CAMLOSTright and CAMLOSTleft are equal to two (2), the future viewing time Tt is adjusted using the following equation: Tt→Tt×Kt3. Then, after adjusting the future viewing time Tt, the braking/driving force control unit 8 proceeds to step S70. The recognition degree KD is determined based on a boldness or sharpness (contrast with respect to the road surface) of an edge of a lane marker and a degree of tracking instability. The degree of tracking instability is a value obtained by using lane marker set based on a plurality of lane candidate points as a reference and applying a statistical computation to a difference between the reference lane marker and each of the lane candidate points. The statistical computation uses, for example, an average value of the differences, a standard deviation, or a total value. It is acceptable for a value obtained by setting, for example, a coefficient that becomes smaller as a difference between edge boldness values becomes smaller and a coefficient that becomes smaller as a tracking instability degree becomes larger and multiplying the set coefficients to obtain a recognition degree KD. It is also acceptable for each of a coefficient that becomes smaller as a difference between edge boldness values becomes smaller and a coefficient that becomes smaller as a tracking instability degree becomes larger to be set as recognition degrees KD. If a calculated recognition degree KD is equal to or smaller than a prescribed value set in advance, then the braking/driving force control unit 8 determines that the recognition degree is low.

The future viewing time Tt is adjusted separately for left and right lane markers. The future viewing time Tt corresponding to the appropriate adjacent lane marker is selected for use depending on whether an obstacle is on the left or right side of the vehicle.

In step S70, the braking/driving force control unit 8 calculates an estimated future position $\Delta Xb$ of the vehicle in a transverse direction with respect to a current traveling lane position using the equation (5) below. The estimated future position $\Delta Xb$ of the vehicle is used to determine if the vehicle will depart from the current lane to change lanes. In other words, the estimated future position $\Delta Xb$ is used to determine whether or not to start a lateral obstacle avoidance control for avoiding the obstacle SM. In actual practice, the estimated future position $\Delta Xb$ is calculated separately for the left and right sides.

$$\Delta Xb = (K1\phi + K2\phi m + K3\phi m') \quad (5)$$

The components of the equation (5) are as follows:
$\phi$: yaw angle
$\phi m$: target yaw angle velocity
$\phi m'$: target yaw angle acceleration The target yaw angle velocity $\phi m$ is determined by using the following equation:

$$\phi m = \Psi \text{driverhosei} \times Tt$$

The target yaw angle acceleration $\phi m'$ is determined by using the following equation:

$$\phi m' = \phi m \times Tt^2$$

The estimated future position $\Delta Xb$ can be expressed based on a headway distance L in order to express it in terms of a yaw angle by using the following equation:

$$\Delta Xb = L \times (k1\phi + k2\phi m \times T + k3(m' \times Tt^2)).$$

The headway distance L and the future viewing time Tt are related as shown in the following equation: Headway distance L=future viewing time Tt×vehicle speed V. Thus, the value of the set gain K1 is a function of the vehicle speed, the value of the set gain K2 is a function of the vehicle speed and the future viewing time, and the value of the set gain K3 is a function of the vehicle speed and the square of the future viewing time.

As shown in the equation below, it is also acceptable to calculate an estimated future position of the host vehicle MM by separately finding a steering angle component and a steering velocity component and selecting the larger of the two components.

$$\Delta Xb = \max(K2\phi m, K3\int \phi m')$$

In step S80, the braking/driving force control unit 8 sets a control start determination threshold value to a prescribed lane-width direction position that is determined in advance.

This determination threshold value is used to determine whether or not a lateral obstacle avoidance control will be started with respect to an obstacle SM located laterally of the host vehicle.

In this embodiment, if it has been detected that an obstacle SM exists within a preset obstacle detection region located laterally of the host vehicle MM, then a lane marker position is used as a reference and an obstacle distance X2obst indicating a lane-width direction position that is located laterally outward from the lane marker is set as the determination threshold value (see FIG. 4). The obstacle distance X2obst is a value set as a distance with respect to an imaginary obstacle SM. In other words, the control processing is executed as though the obstacle SM exists at distance equal to the obstacle distance X2obst in an outward direction from the lane marker. It is acceptable to set the obstacle distance X2obst, i.e., the displacement from the lane marker to the imaginary obstacle SM, to 0. In such a case, the position of the lane marker and the position indicated by the obstacle distance X2obst are the same. Also in FIG. 4, a transverse distance X0 indicates a transverse distance between the host vehicle MM and the lane marker.

When the radar devices 24L and 24R can detect a distance with respect to an obstacle SM with a prescribed degree of accuracy, a relative transverse distance $\Delta O$ (i.e., $\Delta O = X0 + X2obst$) between the host vehicle MM and the obstacle SM is detected. The relative transverse distance $\Delta O$ is then used to calculate the determination threshold value as shown in FIG. 4, i.e., $\Delta O - X0$ ($\Delta O - X0 = X2obst$). When a lane marker is not taken into account (e.g., when a target yaw rate is revised using a neutral yaw rate A path) and the relative transverse distance $\Delta O$ is small, there is a possibility that it will become impossible to distinguish whether a relative driving movement between the host vehicle MM and an obstacle SM indicates an attempt to maintain a path within a lane or an attempt to change lanes.

In such a case, the transverse distance $\Delta O - X0$ between the lane marker and the obstacle is the obstacle distance X2obst. However, even if the relative lateral distance $\Delta O$ can be detected, it is not necessary to use the transverse distance $\Delta O - X0$ as is as the obstacle distance X2. For example, it is acceptable to set a value $\Delta O - X0 - \alpha$ as the obstacle distance X2obst or to set a value obtained by multiplying the difference $\Delta O - X0$ by a gain that is smaller than 1 as the obstacle distance X2obst.

In this embodiment, an X-Y coordinate system is used in which a Y axis is oriented in along the direction in which the traveling lane extends and an X axis is oriented in a direction perpendicular to the direction of the road, i.e., in a widthwise direction of the lane. A transverse position of the obstacle SM is detected as a coordinate on the X axis. The relative transverse distance $\Delta O$ is found based on this transverse position.

An obstacle detection region for detecting if an obstacle SM exists is set to span between prescribed longitudinal and transverse positions located laterally from the host vehicle MM. The longitudinal positions are set such that as the relative velocity at which the obstacle SM is approaching the host vehicle MM becomes larger, the obstacle detection region becomes larger.

In step S90, the braking/driving force control unit 8 executes a control start determination. First, the control unit 8 determines if there is an existence Lobst and/or Robst of an obstacle SM. If an obstacle exists on neither the left nor the right, the control unit sets a lateral obstacle avoidance control determination flag Fout_obst to OFF and proceeds to step S100.

Meanwhile, if an obstacle SM exists on at least the left side or the right side, the control unit 8 determines if the equation $X2 = \Delta Xb - X0 \geq X2obst$ is satisfied on the side of the lane marker where the obstacle exists. If so, the control unit 8 determines that the lateral obstacle avoidance control will be started. If a lane marker cannot be detected, then, for example, a transverse distance from immediately before the lane marker became undetectable is used. In other words, as shown in FIG. 4, the braking/driving force control unit 8 determines if the estimated future position $\Delta Xb$ of the host vehicle MM is equal to or larger than the obstacle distance $\Delta X2obst$. If the aforementioned condition is satisfied, then the braking/driving force control unit 8 determines to start control with respect to the obstacle SM because the host vehicle can be assumed to be changing lanes toward the obstacle SM. When it determines that control will be started with respect to the obstacle SM, the control unit 8 sets the lateral obstacle avoidance control determination flag Fout_obst to ON. If the aforementioned condition is not satisfied, i.e., if the estimated future position $\Delta Xb$ is smaller than the determination threshold value, then the braking/driving force control unit 8 sets the lateral obstacle avoidance control determination flag Fout_obst to OFF.

In actual practice, an estimated future position $\Delta Xb$ is calculated separately for each of the left and right sides as $\Delta XbL$ and $\Delta XbR$ and separate determinations are executed for the left and right sides.

The obstacle SM targeted by this control is not limited to vehicles located laterally rearward of the host vehicle MM; it can also be applied to oncoming vehicles traveling in an adjacent lane.

When the transverse distance ($\Delta O - X0$) between the lane marker and the obstacle is used, then it is acceptable to determine if a lateral obstacle avoidance control should be started in the manner that will now be explained.

As shown in FIG. 4, the control unit 8 determines that a driver has performed a lane change or other driving operation that will cause the host vehicle MM to contact an obstacle SM when the following equation is satisfied, i.e., when an estimated future position $\Delta Xb$ of the host vehicle MM has reached the distance $\Delta O$ with respect to the detected obstacle SM, i.e., $\Delta Xb - X0 \geq \Delta O - X0$. In actual practice, the equation $\Delta Xb \geq \Delta O$ is used because the meaning is the same.

Regarding determining if the estimated future position AXb is smaller than the determination threshold value, it is acceptable to include a hysteresis factor F by using such an equation as $\Delta Xb - \Delta O < X2 - F$. In this way, a dead zone can be established in which the lateral obstacle avoidance control is not performed. That is, a dead zone can be provided between a control intervention threshold value and a control end threshold value.

The flag Fout_obst can only be set to ON when the flag Fout_obst is OFF. It is also acceptable to add a time-related condition for allowing the flag Fout_obst to be turned ON, such as requiring a prescribed amount of time to have elapsed since the flag Fout_obst was last set to OFF. The control can also be contrived such that when a prescribed amount of time Tcontrol has elapsed since the flag Fout_obst was determined to be ON, the flag Fout_obst is turned OFF and the control ends.

During execution of the lateral obstacle avoidance control, a control execution direction Dout_obst is determined based on a determined direction of an estimated future position of the host vehicle. Thus, the direction Dout_obst is set to LEFT (Dout_obst=LEFT) if the estimated future position is to the left and to RIGHT (Dout_obst=RIGHT) if the estimated future position is to the right. If an anti-skid control system (ABS), a traction control system (TCS), or a vehicle dynamic control system (VDC) is operating, then the lateral obstacle avoidance control determination flag Fout_obst is set to OFF. The flag Fout_obst is turned OFF when an automatic braking control is operating so that the lateral obstacle avoidance control will not be executed.

This determination method accomplishes the same task as would be accomplished by setting a separate threshold value for each of the steering velocity $\delta'$, the steering angle $\delta$ and the yaw angle $\phi$ in a direction oriented toward the obstacle SM and setting the threshold values such that the closer the host vehicle MM is to the obstacle SM, the more difficult it is to determine that it is time for a lateral obstacle avoidance control to start. The reason the same task is accomplished is that the target yaw rate $\phi m'$ is found based on a publicly known and widely used relationship between a steering angle and a vehicle speed.

In step S100, the braking/driving force control unit 8 executes a control processing so as to issue a warning. In this embodiment, the braking/driving force control unit 8 issues a warning when it has determined in step S90 that a control start position (determination threshold value) has been reached. It is acceptable to perform the lateral obstacle avoidance control such that the warning is issued before a headway point, which is based on the aforementioned future viewing time Tt reaches a control start position. For example, a prescribed gain Kbuzz (Kbuzz>1) might be used to obtain a longer future viewing time Tt than the future viewing time Tt used in step S90 to detect an avoidance control start. Then, using the longer future viewing time Tt×Kbuzz in the equation (5) to calculate a headway point, a warning can be issued when the headway point is determined in step S90 to have reached the control start position. It is also acceptable to configure the control such that when it is determined in step S90 that the obstacle avoidance system will be started, the avoidance control starts after a prescribed amount of time has elapsed.

In step S110, the braking/driving force control unit 8 sets a target yaw moment Ms. If the lateral obstacle avoidance control determination flag Fout_obst is ON, then the target yaw moment Ms is calculated using the equation (6) as shown below bove, If the lateral obstacle avoidance control determination flag Fout_obst is ON, then the braking/driving force control unit 8 sets the target yaw moment Ms to 0 and proceeds to step S120. If the lateral obstacle avoidance control determination flag Fout_obst is ON, then the braking/driving force control unit 8 calculates the target yaw moment Ms using the equation (6) shown below.

$$Ms = K1recv \times K2recv \times \times Xs \quad (6)$$

wherein, $\times Xs = (Kmom \times \phi + K2om \times \phi m)$

Figure 8:
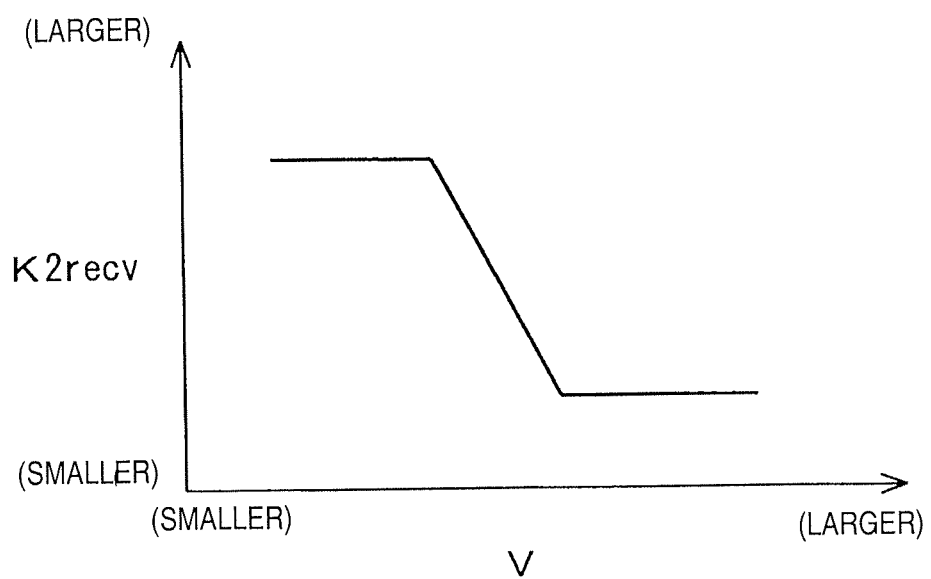
FIG. 8 is a graph illustrating an example characteristic of a gain K2 with respect to the velocity of the host vehicle.
Figure 9:
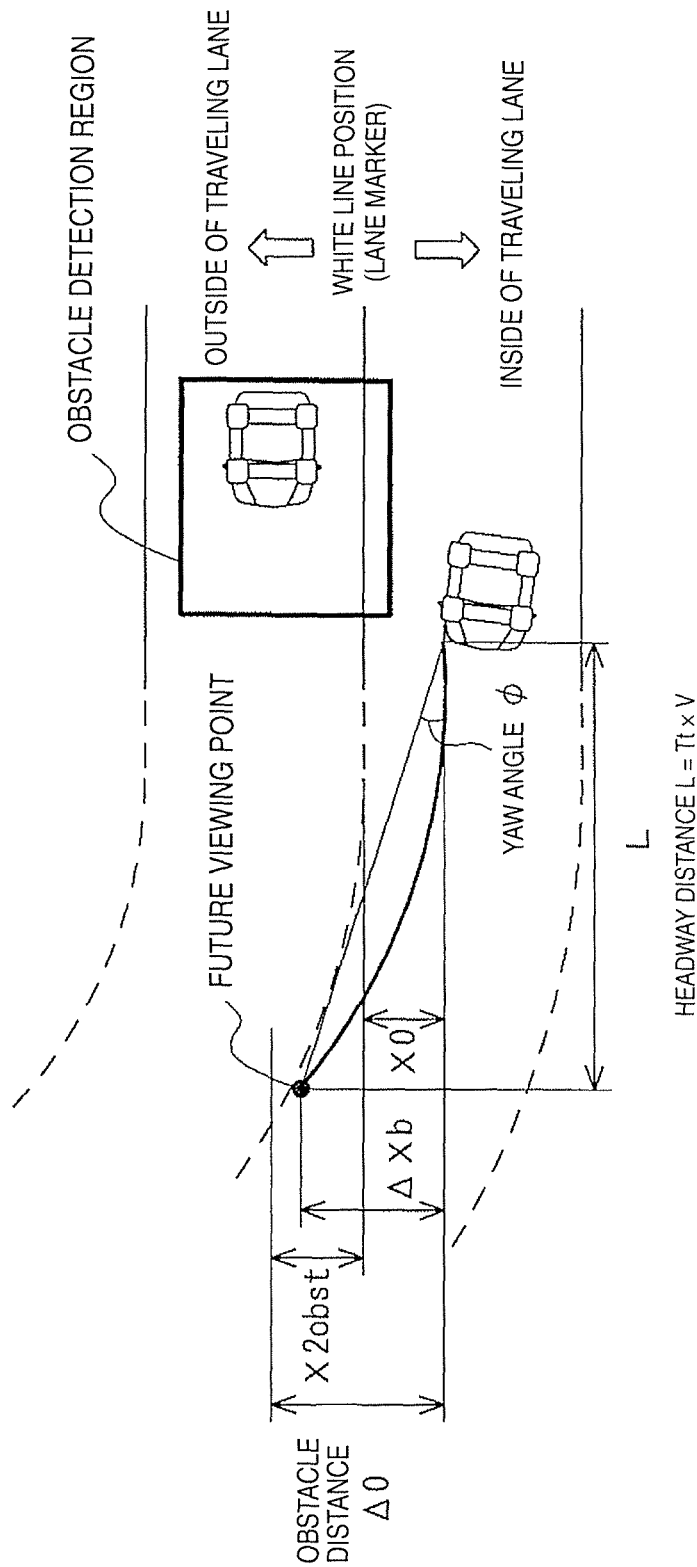
FIG. 9 is a conceptual diagram illustrating an example of a situation in which a lane marker cannot be detected and a curve exists ahead.

The gain K1recv is a proportional gain (yaw inertial moment) determined based on the vehicle specifications. The gain K2recv is a gain that varies according to the vehicle speed V. An example illustrating the gain K2recv is shown in FIG. 8. As shown in FIG. 8, the gain K2recv has a large value in a low speed region and decreases inversely proportionally with respect to the vehicle speed after the vehicle speed reaches a certain value. After the vehicle speed V reaches another certain value, the gain K2recv remains fixed at a small value. The value of the set gain K1mom is a function of the vehicle speed, and the value of the set gain K2mom is a function of the vehicle speed and the future viewing time Tt.

According to the equation (6), the larger a yaw angle $\phi$ with respect to a white line and a steady yaw rate occurring due to the driver cutting the steering wheel are, the larger the target yaw moment Ms becomes.

It is also acceptable to calculate the target yaw moment Ms using the equation (7) shown below. The equation (7) is equivalent to multiplying the expression shown in the equation (6) by a gain K3 (=1/Tt$^2$). The gain K3 decreases as the future viewing time Tt increases.

$$Ms = K1recv \times \times Xb/(L \times Tt^2) \quad (7)$$

The equation (7) reflects a control time T indicating how long the yaw angle will be controlled. Thus, by contriving the control such that the control time T and the future viewing time Tt are equal, the time T required to return the vehicle is shorter when the future viewing time Tt is shorter. As a result, a control effect (amount) is stronger. Consequently, even if the future viewing time Tt is shortened, the control quantity obtained when the control is started will be larger because the gain K3 will be larger. As a result, the control can be executed in accordance with the situation without regard to the set future viewing time Tt such that the driver experiences less of a feeling that something is odd about the vehicle.

The determination of the value of the flag Fout_obst serves to estimate a future change of the path of the vehicle based on steering information.

In step S120, the braking/driving force control unit 8 calculates a command for generating a target yaw moment Ms for avoiding the obstacle. After sending the calculated command, the control unit 8 returns to the start of the control sequence. An example in which a yaw rate Ms calculated according to this embodiment for avoiding an obstacle is generated by using braking and driving forces to produce a yaw moment will now be explained. If a steering reaction force control apparatus is used to generate the yaw rate, then a steering reaction force Frstr is produced according to the following equation:

$$Frstr = K \times Ms.$$

If a steering control apparatus is used to generate the yaw rate, then a steering angle STR$\theta$ produced according to the equation STR$\theta$=K×Ms' is applied to the steering.

It is also acceptable to use a steering control apparatus to generate the yaw rate by generating a steering force (steering torque) STRtrg given by STRtrg=K×Ms.

When the target yaw moment Ms is 0, i.e., when it is determined that a condition(s) is (are) such that a yaw moment control will not be executed, a target brake fluid pressure Psi (i=fl, fr, rl, rr) of each of the wheels is set to a brake fluid pressure Pmf or Pmr.

$$Psfl = Psfr = Pmf \quad (8)$$

$$Psrl = Psrr = Pmr \quad (9)$$

The pressure Pmf is a brake fluid pressure for the front wheels. The pressure Pmr is a brake fluid pressure for the rear wheels and is a value calculated based on the brake fluid pressure Pmf for the front wheels in accordance with a distribution between front and rear. For example, if a driver is operating a brake, then the brake fluid pressures Pmf and Pmr are set to values corresponding to a brake operation amount (master cylinder fluid pressure Pm).

Meanwhile, if the absolute value of the target moment Ms larger than 0, i.e., if it has been determined that a lateral obstacle avoidance control will be started, then the following control processing is executed. Based on the target yaw moment Ms, a front wheel target brake fluid pressure difference $\Delta$Psf and a rear wheel target brake fluid pressure difference $\Delta$Psr are calculated. More specifically, the target brake fluid pressure differences ΔPsf and ΔPsr are calculated according to the equations (10) and (11) shown below.

$$\Delta Psf = 2 \times Kbf \times (Ms \times FRratio)/Tr \quad (10)$$

$$\Delta Psf = 2 \times kbr \times (Ms \times (1-FRratio))/Tr \quad (11)$$

The components of the equation are as follows:
FRratio: setting threshold value
Tr: tread, and
Kbf and Kbr: conversion coefficients for converting a braking force into a brake fluid pressure for the front wheels and rear wheels In this example, the value of the tread Tr is assumed to be the same for both the front and the rear for convenience. Kbf and Kbr are determined based on brake specifications.

The distribution of the braking forces generated at the wheels is determined according to the magnitude of the target yaw moment Ms. In other words, a prescribed value is given to each of the target brake fluid pressure differences ΔPsf and ΔPsr such that a braking force difference occurs between the left and right front wheels and between the left and right rear wheels, respectively. The calculated target brake fluid pressure differences ΔPsf and ΔPsr are then used to calculate a final target brake fluid pressure Psi (i=fl, fr, rl, rr) of each wheel.

More specifically, if the control execution direction Dout_obst is set to LEFT, i.e., if the lateral obstacle avoidance control is to be executed with respect to an obstacle on the left, then the target brake fluid pressure Psi (i=fl, fr, rl, rr) is calculated for each of the wheels according to the equations (12) shown below.

$$Psfl = Pmf$$

$$Psfr = Pmf + \Delta Psf$$

$$Psrl = Pmr$$

$$Psrr = Pmr + \Delta Psr \quad (12)$$

If control execution direction Dout is set to RIGHT, i.e., if the vehicle exhibits a trend of departing from the lane with respect to a right-hand lane marker, the target brake fluid pressure Psi (i=fl, fr, rl, rr) is calculated for each of the wheels according to the equations (13) shown below.

$$Psfl = Pmf + \Delta Psf$$

$$Psfr = Pmf$$

$$Psrl = Pmr + \Delta Psr$$

$$Psrr = Pmr \quad (13)$$

With the equations (12) and (13), a braking/driving force difference is generated between left and right wheels such that the wheel braking forces are larger on the side where a lane departure is to be prevented. As shown in the equations (12) and (13), the target brake fluid pressures Psi (i=fl, fr, rl, rr) of the wheels are calculated so as to take into account a brake operation by the driver, i.e., the brake fluid pressures Pmf and Pmr. The braking/driving force control unit 8 sends the calculated target brake fluid pressures Psi (i=fl, fr, rl, rr) of the wheels as brake fluid pressure command values to the brake fluid pressure control section 7.

The estimated future position ΔXb serves as a future transverse position where the vehicle will be after a future viewing time Tt has elapsed and is calculated based on a yaw angle φ, a yaw angle velocity φm, and other parameters indicating a traveling state of the vehicle. If the estimated future position ΔXb is on the same side as a detected obstacle SM and equals or exceeds an obstacle distance X2obst measured outward from lane marker used as a reference, then a lateral obstacle avoidance control for avoiding the obstacle SM is started (see FIG. 4). When it has been determined that the lateral obstacle avoidance control will be started, a target yaw moment Ms is calculated as a control quantity based on the estimated future position ΔXb and a braking/driving force control is executed such that the target yaw moment Ms is generated. In this way, the vehicle is controlled in such a direction that it is prevented from laterally approaching the obstacle. In order to control the vehicle in such a direction that it is prevented from laterally approaching the obstacle, a control is executed so as to generate a yaw moment oriented toward a middle of the lane in which the vehicle is traveling.

In this embodiment, if the recognition degree of a lane marker is low (i.e., when the value of the lane marker flag CAMLOSTright or CAMLOSTleft is 1 or 2), then the future viewing time Tt is adjusted in a direction of becoming shorter than a preset future viewing time Tt0. Also, as a state in which a lane marker cannot be detected (i.e., a state in which the value of the lane marker flag CAMLOSTright or CAMLOSTleft is 1) continues to become longer, the more readily the apparatus can determine that a degree of certainty regarding the traveling path is low. Therefore, the future viewing time Tt is shortened in accordance with the amount of time a state in which a lane marker cannot be detected has continued. For example, if a lane marker cannot be detected in a situation like that shown in FIG. 4, then it is also feasible for the apparatus to assume that the host vehicle is entering a curve in the road. In other words, when the lane marker cannot be detected, even if the relative transverse distance between the host vehicle and the obstacle is short, the apparatus cannot accurately distinguish whether the distance is short because the host vehicle is changing lanes or because the vehicle is heading into a curve.

Figure 10:
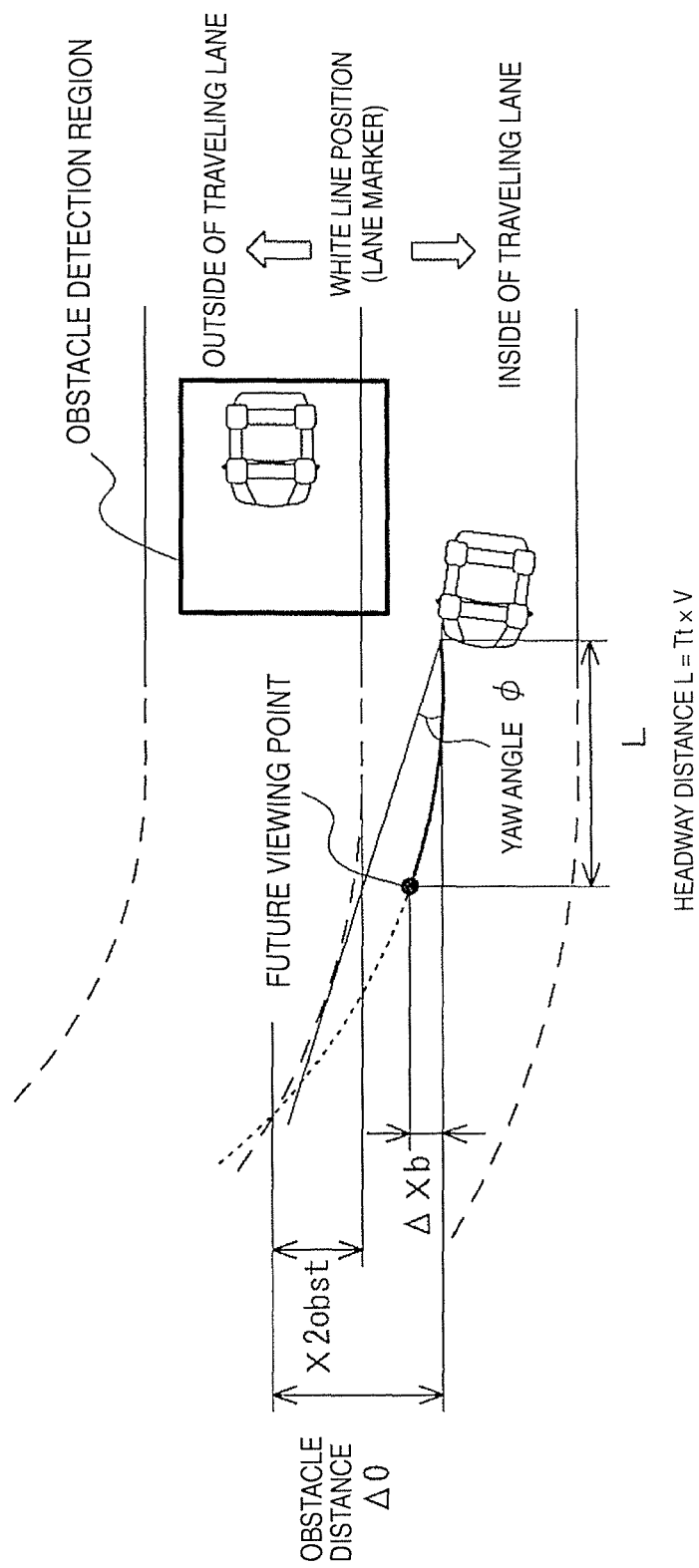
FIG. 10 is a conceptual diagram illustrating an example in which a lane marker cannot be detected and a headway point adjusted to be closer.

In such a case, this embodiment is configured to adjust the future viewing time Tt to a shorter time, as shown in FIG. 10. In other words, the headway point is moved closer to the current host vehicle position and it becomes more difficult for the lateral obstacle avoidance control to start. In this way, even though the lane marker cannot be detected, the unnecessary starts and stoppages of the control can be prevented. By reducing the frequency with which the lateral obstacle avoidance control intervenes, changes in the vehicle behavior resulting from the lateral obstacle avoidance control can be suppressed and the degree to which a driver experiences a feeling that something is odd about the vehicle can be reduced.

Also, since the future viewing time Tt is merely shortened, lateral obstacle avoidance control is still executed with respect to lateral obstacles when necessary. Thus, while executions of the lateral obstacle avoidance control that cause the driver to experience an odd feeling are reduced, the lateral obstacle avoidance control can be started when the driver deliberately steers toward an obstacle SM.

In this embodiment, the radar devices 24L and 24R constitute the obstacle detecting device. The imaging section 13 constitutes the lane detecting device. The steering angle sensor 19 constitutes the steering input detecting device. Step S70 constitutes the future position estimating section 8A. Steps S35 and S65 constitute the start determination suppressing section 8Ba. Steps S80 and S90 constitute the control start determination section 8B.

The lane detecting device is configured to acquire information regarding an area surrounding the host vehicle employing the lateral obstacle avoidance control and detect a lane marker of a lane in which the vehicle is traveling. The future position estimating section or device is configured to estimate a future transverse position where the host vehicle will be after a prescribed amount of time has elapsed. The control start determining section is configured to determine that a control should be started when it determines that a future transverse position of the host vehicle estimated by the future position estimating device is positioned at a prescribed lane-width direction position that is determined using the lane marker as a reference or farther toward an outside of the lane from a middle of the lane than the prescribed lane-width direction position. The vehicle control unit is configured to control the vehicle such that a yaw moment oriented toward a middle of the lane in which the vehicle is traveling is imparted to the vehicle when the control start determining section determines that the control should be started.

The vehicle control start determining section has a start determination suppressing section configured to suppress the occurrence of a determination that the control should be started when a recognition degree of the lane marker used by the control start determining section as a reference is low, i.e., to make a determination that the control should be started occur less readily when the recognition degree is low than when the recognition degree is normal.

With this embodiment, a starting of a lateral obstacle avoidance control is suppressed when the recognition degree of a lane marker of a lane in which the vehicle is traveling is low. As a result, a necessary lateral obstacle avoidance control can be executed while preventing unnecessary starting and ending of the control. Thus, while starting of the lateral obstacle avoidance control that causes the driver to experience an odd feeling is reduced, the lateral obstacle avoidance control can be started when the driver deliberately steers toward an obstacle. As a result, even if the recognition degree of the lane marker is low, an appropriate lateral obstacle avoidance control can be executed.

The control avoidance control start determining section 8B is configured to determine if the lateral obstacle avoidance control should be started based on a relationship between a future position of the vehicle and a determination threshold value (lane-width direction position) determined using a lane marker located on a side of the vehicle that is closer to an obstacle as a reference. The start determination suppressing section 8Ba is configured to suppress a start of the lateral obstacle avoidance control when the lane detecting device determines that a recognition degree of a lane marker on a side of the host vehicle that is closer to an obstacle has become low. In other words, it suppresses a determination that the control should be started when a recognition degree of the lane marker is low.

Thus, a necessary lateral obstacle avoidance control can be executed with respect to an obstacle located laterally of the host vehicle but unnecessary starting and ending of the control can be prevented. In other words, while executions of the lateral obstacle avoidance control that cause the driver to experience an odd feeling are reduced, the lateral obstacle avoidance control can be started when the driver deliberately steers toward an obstacle SM. As a result, even if a lane marker cannot be detected, a lateral obstacle avoidance control can be executed appropriately with respect to an obstacle located laterally of the host vehicle.

Meanwhile, if a lane marker is detected, then the vehicle control device determines a future position of the vehicle with respect to an obstacle using the detected lane marker as a reference. By using the lane marker as a reference, the vehicle control device can determine if the degree to which the host vehicle is oriented toward an obstacle is appropriate even when the vehicle is being steered through a curve in the road. As a result, even if the host vehicle is traveling through a curve, a lateral obstacle avoidance control can be executed appropriately to avoid an obstacle.

The start determination suppressing section 8Ba is configured to suppress a determination that the control should be started by shortening the prescribed amount of time used to estimate a future position of the vehicle. As a result, a control start determination can be suppressed easily.

When it is determined that the lane detecting device cannot detect a lane marker, a position of a lane marker is estimated based on information obtained when a lane marker could be recognized. The control start determining section is configured to determine if the lateral obstacle avoidance control should be started based on the estimated lane marker when the lane detecting device cannot detect a lane marker. The start determination suppressing section is configured to suppress the occurrence of a determination that the control should be started when an estimated lane marker is used as a reference by the control start determining section, i.e., to make a determination that the control should be started occur less readily when an estimated lane marker is used than when the recognition degree of the lane marker is normal.

A determination that the control should be started is suppressed when a lane marker of a lane in which the vehicle is traveling cannot be detected. As a result, a necessary lateral obstacle avoidance control can be executed while preventing unnecessary starting and ending of the control. Thus, while starting of the lateral obstacle avoidance control that causes the driver to experience an odd feeling is reduced, the lateral obstacle avoidance control can be started when the driver deliberately steers toward an obstacle. As a result, even if a lane marker has become undetectable, an appropriate lateral obstacle avoidance control can be executed.

When an amount of time that a lane marker has continued to be undetectable is long, the start determination suppressing section 8Ba suppresses a determination that the lateral obstacle avoidance control should be started in comparison with when the same amount of time is short.

As a recognition state of a lane marker continues to decline, a degree of certainty regarding the traveling path declines and the probability that a direction in which the vehicle is moving will change increases. Therefore, the vehicle control device is contrived such that as a recognition state of a lane marker continues to decline, it becomes more difficult to determine that the lateral obstacle avoidance control should be started. As a result, interventions of the lateral obstacle avoidance control in a manner causing a driver to experience a feeling that something is odd can be made to occur even less frequently.

When it determines that a recognition degree at which the lane is detected has declined and suppresses a determination that the lateral obstacle avoidance control should be started, the start determination suppressing section 8Ba suppresses the control start more if the vehicle speed is low than if the vehicle speed is high. That is, the lower the vehicle speed is, the less readily a determination that the control should be started will occur.

The lower the vehicle speed is, the larger a vibration of the vehicle becomes and the more a yaw rate of the vehicle tends to increase. Consequently, unnecessary intervention and ending of the control could occur repeatedly. However, such unnecessary intervention of the control can be suppressed. Thus, even when the vehicle speed is low and there is a possibility that more compact movements will occur, it is possible to reduce the frequency at which intervention (execution) of the control causes a driver to experience a feeling that something is odd.

The vehicle control device is contrived such that when the start determination suppressing section is suppressing a determination by the control start determining section that the control should be started, the vehicle control device increases a control gain of a control quantity used to control the vehicle such that a yaw moment oriented toward a middle of the lane is imparted to the vehicle. That is, when a determination that the control should be started is prevented, a control gain of a control quantity is revised to a higher value.

Even when intervention of the control is delayed by, for example, shortening the headway point, a large control quantity can be generated. More specifically, a larger control quantity can be generated when the vehicle has approached very close to an obstacle SM and a smaller control quantity can be generated when the vehicle has approached an obstacle SM but is farther away. As a result, a control quantity that is more in line with what a driver would feel to be appropriate can be generated.

In the previously described embodiment, the future viewing time Tt is revised to a shorter amount of time by multiplying the future viewing time Tt by a lost gain that is determined based on a lost time, i.e., an amount of time that a state in which a lane marker cannot be detected has continued. In this way, a headway point is adjusted and a determination that a control (obstacle avoidance control) should be started is suppressed. Additionally, by adjusting the headway point, a control quantity (target yaw moment Ms) used during execution of the control is also adjusted.

Instead, it is acceptable to multiply the estimated future position ΔXb calculated in step S70 by the lost gain. The resulting effects are the same. The estimated future position ΔXb is a value related to a transverse position of the headway point.

(2) It is also acceptable to suppress a determination that the control (obstacle avoidance control) should be started by multiplying ΔXb by the lost gain and using the resulting value in step S90 as a condition for determining if the lateral obstacle avoidance control should be started. With this approach, even though the timing at which the vehicle control device determines that the control should be started is adjusted with the lost gain, the control quantity (target yaw moment Ms) generated when the control is executed is not affected by the lost gain.

In the previously described embodiment, the position of the headway point is adjusted by multiplying the future viewing time Tt or the estimated future position ΔXb by a gain Kt. Thus, the start timing of the lateral obstacle avoidance control is adjusted by multiplying the entire value indicating the headway point by the gain Kt.

The following equation expresses approach used in the previous embodiment.

$$\Delta Xb = Kt \times (K1\phi + K2m + K3\phi')$$

In the equation, Kt is the lost gain.

Instead, it is acceptable to multiply each of the variables φ, φm, and φm' constituting ΔXb by a separate gain Kt, as shown in the equation below.

$$\Delta Xb = (Kta \times K1 \times \phi + Ktb \times K2 \times \phi m' + Ktc \times K3 \times \phi m')$$

Thus, the gains applied to each of φ, φm, and φm' can be adjusted separately. For example, a determination that the control should be started can be suppressed by reducing the steering angle component more than the steering velocity component. That is, among the steering quantities resulting from steering input by the driver, a steering velocity component is adjusted by a larger amount relative to the steering angle component. In this way, the vehicle control device suppresses determinations that the lateral obstacle avoidance control should be started in response to corrective steering or normal intentional steering. Also, the control can be tailored such that executions of the lateral obstacle avoidance control that cause the driver to experience an odd feeling are reduced effectively when the lane marker cannot be easily seen but the lateral obstacle avoidance control can still be started when the driver deliberately steers toward an obstacle SM.

In other words, a degree to which starting of the lateral obstacle avoidance control is suppressed is increased as an uncertainty regarding how much a shape of a path of the vehicle can change after the lane marker becomes undetectable increases. When a driver steers the vehicle toward an obstacle, the steering angle and the steering velocity are used to determine if the vehicle is changing lanes toward the obstacle and could possibly contact the obstacle. Setting the gain to a smaller value in a situation where a corrective steering operation is likely to occur means that the values of the steering angle and the steering velocity have to be larger in order to determine that the lateral obstacle avoidance control should be started.

Of the steering angle component and the steering velocity component detected by the future position estimating device, the start determination suppressing section revises the steering angle component by a larger amount.

It is possible for a steering operation performed by a driver to have been performed in order to steer the vehicle through a curve. Therefore, the gain applied to the steering angle component is lowered because it is highly probable that a situation will occur in which a leftward or rightward steering angle is held in a substantially steady state. As a result, the ability to detect a steering operation that includes a steering velocity and is part of an attempt to change lanes is maintained while alleviating the repeated occurrence of unnecessary execution of the lateral obstacle avoidance control when the host vehicle is traveling along a steady path.

Second Embodiment

A second embodiment of a vehicle driving control apparatus will now be explained with reference to the drawings. Parts that are the same as those of the first embodiment are indicated with the same reference numerals. The constituent features of this embodiment are basically the same as the constituent features of the first embodiment. In other words, the host vehicle equipped with this embodiment of the vehicle driving control apparatus has the same construction as seen in FIGS. 1 to 3. However, the method of determining if the lateral obstacle avoidance control should be started is different.

The first embodiment presents an example in which the vehicle control device executes a control start determination in step S90 when an obstacle SM exists on at least the left side or the right side of the vehicle. Instead, in this embodiment, the vehicle control is contrived such that if a future transverse position of the host vehicle is located farther toward an outside in a widthwise direction of the traveling lane than a determination threshold value (a prescribed lane-width direction position with respect to a lane marker used as a reference), then the vehicle control device determines that the host vehicle could possibly depart from the lane and executes a control start determination in step S90 regardless of whether an obstacle SM exists. In other words, in this embodiment, the vehicle control functions as a lane departure prevention control serving to prevent the host vehicle from departing from the lane.

In this embodiment, the obstacle distance X2obst—which is a position measured in a widthwise direction of a lane (lane-width direction position) with respect to a lane marker position that is used as a reference, is set to 0 or to a preset distance that is closer inward than the lane marker position. Thus, the obstacle distance X2obst is set to a negative value. As explained above, in this embodiment, the vehicle control is a lane departure prevention control contrived such that if a future transverse position of the host vehicle is located farther toward an outside in a widthwise direction of a lane than a determination threshold value, then the vehicle control device determines that the host vehicle could possibly depart from the lane and executes a control start determination regardless of whether an obstacle SM exists. Therefore, the control is not configured to detect if an obstacle SM exists. Thus, the obstacle distance X2obst used in this embodiment is not an assumed distance between a lane marker and an obstacle as in the first embodiment. Instead, in this embodiment, it is merely a prescribed distance that is determined in advance and is only called an "obstacle distance X2obst" for convenience.

Figure 11:
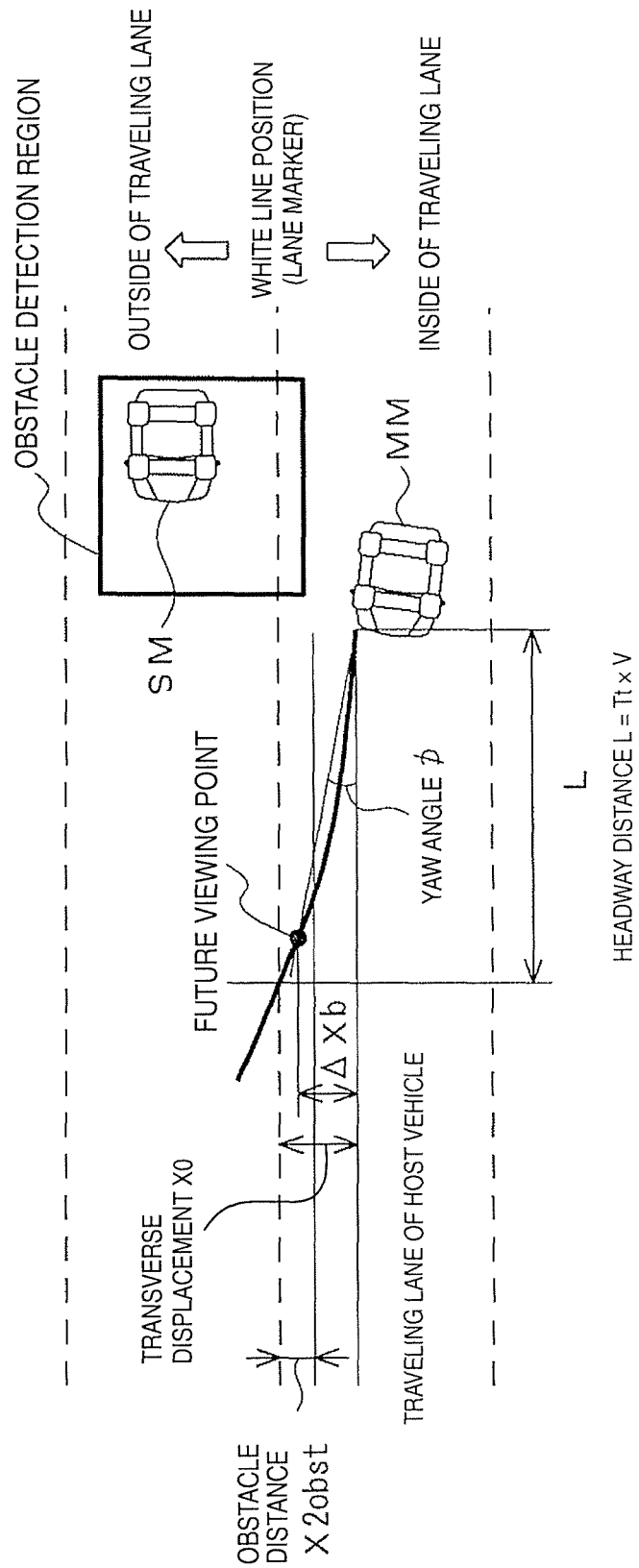
FIG. 11 is a conceptual diagram illustrating a relationship between an obstacle and a vehicle according to a second embodiment.

FIG. 11 is a conceptual diagram for this embodiment and corresponds to FIG. 4. Also in this embodiment, a value ΔO is not set because there is no need for a relative distance with respect to an obstacle.

In step S90, the vehicle control device executes a determination as to whether the control (lane departure prevention control) should be started if the condition defined by the equation below:

$$\Delta Xb \geq X0 + X2\text{obst}(\geq X0)$$

In this embodiment, a lane departure prevention control (vehicle control) prevents the host vehicle from departing from a lane, i.e., moving beyond a lane marker, is started when an estimated future position ΔXb of the host vehicle is located at a prescribed lane-width direction position (obstacle distance X2obst) set in advance to be on an inward side of a lane marker or farther to an outside of the lane marker than the prescribed lane-width direction position (obstacle distance X2obst) set in advance (see FIG. 11). When it has been determined that the lane departure prevention control will be started, a target yaw moment Ms is calculated as a control quantity based on the estimated future position ΔXb and a braking/driving force control is executed such that the target yaw moment Ms is generated. In this way, the host vehicle MM is controlled in such a direction as to resist departing from the lane (deviating beyond the lane marker) by imparting to the vehicle a yaw moment oriented toward a middle of the lane. In this way, the host vehicle can be prevented from departing from the lane.

Otherwise, the operation and functions of this embodiment are the same as the first embodiment, including setting the future viewing time Tt according to a recognition degree of the lane marker.

It is feasible to combine the lane departure prevention control described in this embodiment with the vehicle control like that described in the first embodiment. In such a case, when one of the lane departure prevention control and the lateral obstacle avoidance control is started before the other, the control that was started earlier is given priority and the other control is not executed until the control that was started earlier has ended.

The control start is suppressed when a recognition degree of a lane marker of a lane in which the host vehicle is traveling is low. As a result, a necessary vehicle control can be executed while preventing unnecessary starting and ending of the lane departure prevention control. Thus, while starting of the lane departure prevention control that causes the driver to experience an odd feeling is reduced, the control can be started when the driver deliberately performs a steering operation. As a result, even if the recognition degree of the lane marker is low, an appropriate vehicle control for suppressing a lane departure can be executed.

Third Embodiment

A third embodiment of a vehicle driving control apparatus will now be explained with reference to the drawings. Parts that are the same as those of the previously described embodiments are indicated with the same reference numerals. The constituent features of this embodiment are basically the same as the constituent features of the previously described embodiments. In other words, the host vehicle equipped with this embodiment of the vehicle driving control apparatus has the same construction as seen in FIGS. 1 to 3. However, the method of suppressing a determination that the lateral obstacle avoidance control should be started is different.

In the first embodiment, a future viewing time Tt is multiplied by a lost gain to revise the future viewing time Tt to a shorter value. In this way, a headway point is adjusted and a determination that a control should be started is suppressed. In the first variation of the first embodiment, instead the estimated future position ΔXb of the vehicle is multiplied by a lost gain in step S70 in order to suppress a determination that a control should be started. Meanwhile, in this embodiment, either instead of or in addition to multiplying by a lost gain, a determination that a control should be started is suppressed by adjusting an obstacle distance X2obst to a larger value. In other words, since the obstacle distance X2obst is a prescribed lane-width direction position determined in advance with respect to a reference lane marker, the determination to start a control is suppressed by moving the prescribed lane-width direction position farther outside in a widthwise direction of the lane. In this embodiment, the obstacle distance X2obst is a value serving to define the prescribed lane-width direction position determined in advance with respect to a reference lane marker.

Figure 12:
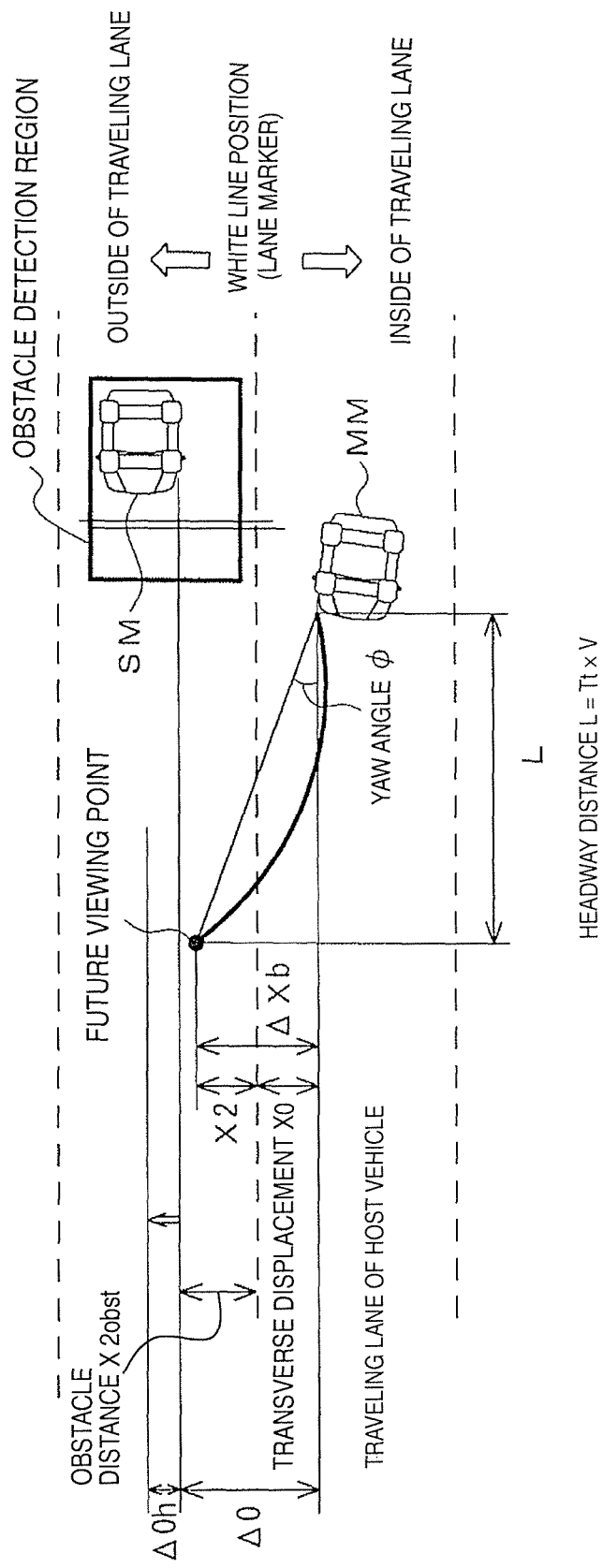
FIG. 12 is conceptual diagram illustrating a relationship between an obstacle and a vehicle according to a third embodiment.

For example, as shown in FIG. 12, the obstacle distance X2obst is increased beyond default value by a revision coefficient ΔOh (>0). In other words, when the vehicle control device determines whether to start a control in step S90, it determines that the control should be started if the condition expressed by the following equation is satisfied.

$$X2 = \Delta Xb - XO \geq X2\text{obst} + \Delta Oh$$

or $$\Delta Xb \geq \Delta O + \Delta Oh$$

Thus, by adding a revision coefficient ΔOh, a prescribed lane-width direction position determined in advance with respect to a reference lane marker is moved farther outside in a widthwise direction of the lane. Instead, it is also acceptable to multiply the distance X2obst or the value ΔO by a gain larger than 1 in order to move the prescribed lane-width direction position determined in advance with respect to a reference lane marker farther outside in a widthwise direction of the lane.

Otherwise, the constituent features of this embodiment are the same as the constituent features of the previously described embodiments.

The start determination suppressing section suppresses a determination that a control should be started by moving a prescribed lane-width direction position determined in advance with respect to a reference lane marker farther outside in a widthwise direction of a lane. As a result, a control start determination can be suppressed easily.

Fourth Embodiment

A fourth embodiment of a vehicle driving control apparatus will now be explained with reference to the drawings. Parts that are the same as those of the previously described embodiments are indicated with the same reference numerals. The constituent features of this embodiment are basically the same as the constituent features of the previously described embodiments. In other words, the host vehicle equipped with this embodiment of the vehicle driving control apparatus has the same construction as seen in FIGS. 1 to 3. However, the method of determining if a recognition degree of a lane marker is low is different and a method of computing a current recognition degree KD of a lane marker when the recognition degree is low is different.

The first embodiment presents an example in which an image processing is applied to an image photographed by the imaging section 13 and a recognition degree KD of a recognized lane marker is determined based on a recognition condition (e.g., edge boldness) of an image of the lane marker itself and a certainty (e.g., degree of tracking instability) of the lane marker itself. In this embodiment, instead of or in addition to determining a recognition degree KD as described above, it is acceptable to make a determination as to whether a recognition degree of a lane marker is low and, if so, to calculate a recognition degree LD in a manner that will now be explained.

The vehicle control device determines that a recognition degree of a lane marker is low when any of the following flags is ON: a transverse position invalid flag DFLGa, a curvature invalid flag DFLGb, a lane change flag DFLGc, a bridge detection flag DFLGd, a non-parallel lane marker determination flag DFLGe, and a transverse acceleration abnormality flag DFLGf. It is also acceptable to use only a portion of the aforementioned flags to determine if a recognition degree of a lane marker is low.

The transverse position invalid flag DFLGa is turned ON when a difference between a current-cycle value of the transverse displacement Xfront of the host vehicle MM and a current position estimated based on a transverse displacement of a previous cycle or transverse displacement values of a plurality of recent cycles is larger than a prescribed difference. The prescribed difference is a value that can be assumed to be too large to be a change in the transverse displacement. The transverse displacement Xfront is computed based on a lane marker extracted from an image photographed by the imaging section 13.

The curvature position invalid flag DFLGb is turned ON when a difference between a current-cycle value of the traveling lane curvature βfront and a current curvature estimated based on a curvature value of a previous cycle or curvature values of a plurality of recent cycles is larger than a prescribed difference. The prescribed difference is a value that can be assumed to be too large to be a change in the lane curvature. The lane curvature βfront is computed based on a lane marker extracted from an image photographed by the imaging section 13.

The lane change flag DFLGc is turned ON when it is determined that the vehicle is changing lanes. When the vehicle is changing lanes, the lane used as a reference changes and the vehicle is traveling while straddling a lane marker. Consequently, it is reasonable to expect the apparatus to have some difficulty determining which lane marker should be used as a reference. Therefore, the vehicle control device determines that the recognition degree of the lane marker is low when the vehicle is changing lanes.

The bridge detection flag DFLGd is turned ON when a junction existing in front of the host vehicle vehicle is detected based on an image photographed by the imaging section 13 in a frontward traveling direction. Here, "in front of the host vehicle vehicle" is defined to mean, for example, that the host vehicle MM will reach the junction after a prescribed amount of time (e.g., after 2 seconds). Depending on the structure of the junction, the lane used as a reference changes and it is reasonable to expect the apparatus to have some difficulty determining which lane marker should be used as a reference. Therefore, the vehicle control device determines that the recognition degree of the lane marker is low when a junction is detected in front of the host vehicle vehicle.

Positions of a left and a right lane marker of a lane in which the vehicle is traveling imaging section 13 are extracted from an image photographed by the imaging section 13. The non-parallel lane marker flag DFLGe is turned ON when the relative positions of the extracted left and right lane markers are determined to be impossible in comparison with a normally expected relationship. Here, "impossible" means that an interval (spacing) between the left and right lane markers is determined to be narrowing or that an interval (spacing) between the left and right lane markers is changing over time at a rate equal to or faster than a prescribed rate.

The transverse acceleration abnormality flag DFLGf is turned ON when a difference between a current-cycle value of the yaw angle φ front of the host vehicle MM with respect to a lane in which the vehicle is currently traveling and a current yaw angle estimated based on a yaw angle value from a previous cycle or plurality yaw angle values from recent cycles is larger than a prescribed difference. The prescribed difference is a value that can be assumed to be too large to be a change in yaw angle. The yaw angle φ front is calculated by the imaging section 13.

Upon determining that the recognition degree of the lane marker is low, a recognition degree KD of a lane marker will be computed. Gains Ka, Kab, Kc, Kd, Ke, and Kf are provided with respect to each of the transverse position invalid flag DFLGa, the curvature invalid flag DFLGb, the lane change flag DFLGc, the bridge detection flag DFLGd, the non-parallel lane marker determination flag DFLGe, and the transverse acceleration abnormality flag DFLGF, respectively.

Figure 13:
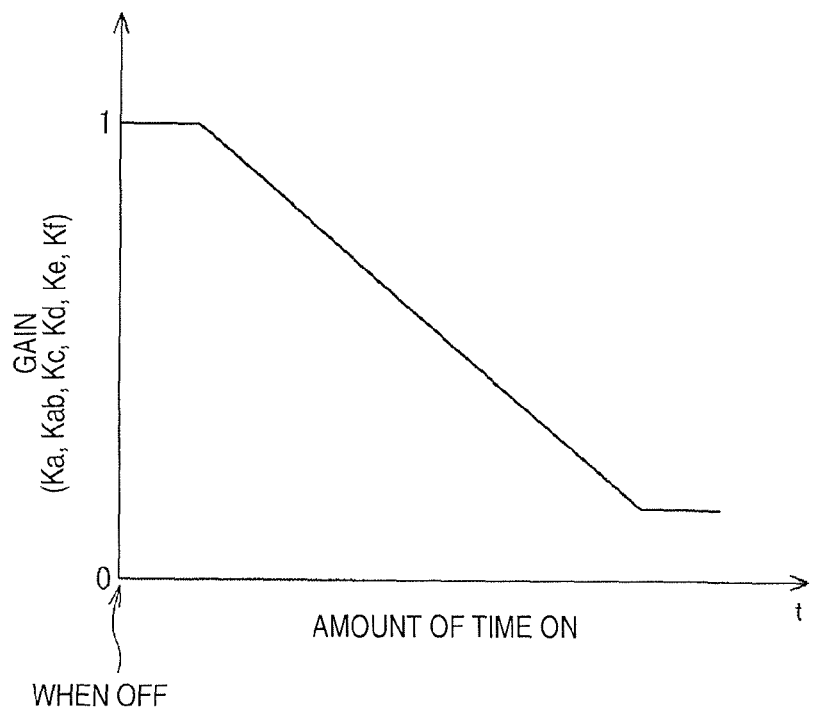
FIG. 13 is a graph illustrating a relationship between a recognition degree related gain and an ON time according to a fourth embodiment.

As shown in FIG. 13, the gain Ka is set to 1 when the transverse position invalid flag DFLGa is OFF and changes in accordance with an amount of time the same flag has continuously been ON when the flag is ON. More specifically, the gain Ka decreases toward zero as the amount of time the flag has been ON increases.

As shown in FIG. 13, the gain Kb is set to 1 when the curvature invalid flag DFLGb is OFF and changes in accordance with an amount of time the same flag has continuously been ON when the flag is ON. More specifically, the gain Kb decreases toward zero as the amount of time the flag has been ON increases.

As shown in FIG. 13, the gain Kc is set to 1 when the lane change flag DFLGc is OFF and changes in accordance with an amount of time the same flag has continuously been ON when the flag is ON. More specifically, the gain Kc decreases toward zero as the amount of time the flag has been ON increases.

As shown in FIG. 13, the gain Kd is set to 1 when the bridge detection flag DFLGd is OFF and changes in accordance with an amount of time the same flag has continuously been ON when the flag is ON. More specifically, the gain Kd decreases toward zero as the amount of time the flag has been ON increases.

As shown in FIG. 13, the gain Ke is set to 1 when the non-parallel lane marker flag DFLGe is OFF and changes in accordance with an amount of time the same flag has continuously been ON when the flag is ON. More specifically, the gain Ke decreases toward zero as the amount of time the flag has been ON increases.

As shown in FIG. 13, the gain Kf is set to 1 when the transverse acceleration abnormality flag DFLGf is OFF and changes in accordance with an amount of time the same flag has continuously been ON when the flag is ON. More specifically, the gain Kf decreases toward zero as the amount of time the flag has been ON increases.

It is acceptable for the slopes of the curves shown in FIG. 13 to be different for each gain. The recognition degree KD is then calculated as follows.

$$KD = Ka \times Kb \times Kc \times Kd \times Ke \times Kf$$

The recognition degree KD is set to 1 when all of the flags are OFF. Meanwhile, the larger the number of flags that are ON and/or the longer a flag or flags has continued to be ON, the closer to zero the value of the recognition degree KD is set.

Otherwise, the constituent features of this embodiment are the same as the constituent features of the previously described embodiments.

In this embodiment, a recognition degree KD of a recognized lane marker can be determined based on something other than a recognition condition (e.g., edge boldness) of an image of the lane marker itself and a certainty (e.g., degree of tracking instability) of the lane marker itself.

Fifth Embodiment

A fifth embodiment of a vehicle driving control apparatus will now be explained with reference to the drawings. Parts that are the same as those of the previously described embodiments are indicated with the same reference numerals. The constituent features of this embodiment are basically the same as the constituent features of the previously described embodiments. In other words, the host vehicle equipped with this embodiment of the vehicle driving control apparatus has the same construction as seen in FIGS. 1 to 3. However, this embodiment is different regarding a processing executed when a lane marker is detected normally again after having been undetectable or having been determined to be detectable with a low recognition degree.

For example, in step S60 of the first embodiment, the future viewing time Tt is set to a future viewing time Tt0, which is a preset default value. Consequently, when a lane marker is detected normally again after having been undetectable or having been determined to be detectable with a low recognition degree, the future viewing time Tt is immediately set to the future viewing time Tt0. Thus, the first embodiment illustrates an example in which a control serving to suppress a determination that another control (e.g., obstacle avoidance control) should be started is aborted and normal control is restored when a lane marker is detected normally again. Conversely, in this embodiment, when a lane marker is detected normally again after having been undetectable or having been determined to be detectable with a low recognition degree, a control serving to suppress a determination that another control should be started is gradually lessened over a prescribed restoration time Tf. In other words, when a lane marker is detected normally again after the lane marker has been determined to have a low recognition degree and the future viewing time Tt has been set to a value shorter than the default value, the control serving to suppress a determination that another control should be started is gradually lessened by gradually increasing the future viewing time Tt such that it returns to the default value after the restoration time Tf has elapsed.

Figure 14:
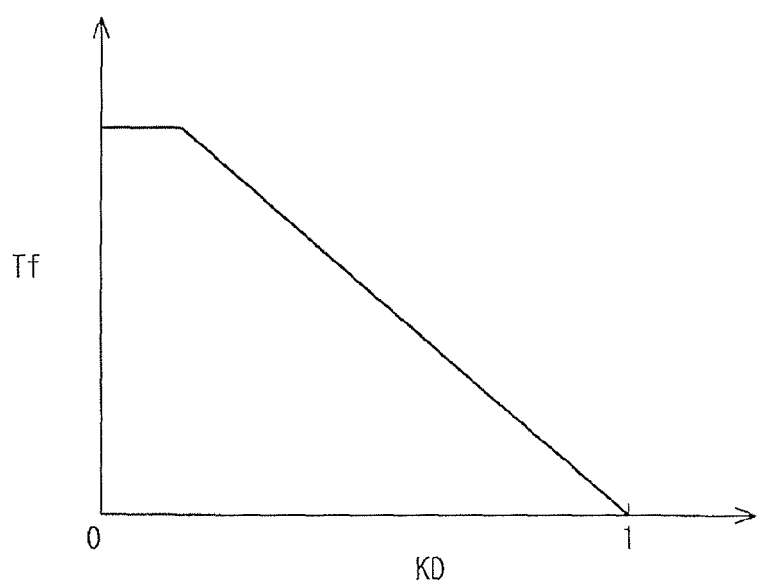
FIG. 14 is a graph illustrating a relationship between a recognition degree and a restoration time.

The restoration time Tf is set based on a recognition degree KD (degree which the lane marker can be recognized) as shown in FIG. 14. More specifically, the smaller a recognition degree KD occurring immediately before the lane marker became normally detectable again is, the larger restoration time Tf is set. If the lane marker could not be detected at all before becoming normally detectable, then the recognition degree KD occurring immediately before is assumed to be 0. Conversely, if the lane marker is already detected normally, then the recognition degree KD is set to 1.

Computational processing executed in this embodiment will now be explained. The future viewing time Tt is set in advance to a future viewing time Tt0 as a default value, and the process of setting the future viewing time Tt to the future viewing time Tt0 is omitted from step S60.

Then, in step S65, the processing that will now be explained is added to the processing explained above about when the values of the lane marker flags CAMLOSTright and CAMLOSTleft are equal to zero (0) so as to be executed before the vehicle control device (control unit 8) proceeds to step S70. The values of the lane marker flags CAMLOSTright and CAMLOSTleft from the previous cycle (one control cycle prior) are checked and control processing is executed accordingly as will now be explained.

Now the situation of when the value of the lane marker flag CAMLOSTright or CAMLOSTleft from the previous cycle (one control cycle immediately prior) is not zero (0). First, the vehicle control device computers a restoration time Tf based on FIG. 14 using the recognition degree KD. If the lane marker could not be detected at all, then the recognition degree KD is assumed to be 0. The vehicle control device also computes a time difference $\Delta Tt$ between the current future viewing time Tt and the default value Tt0. The vehicle control device then computes a number of control cycles corresponding to the restoration time Tf and multiplies the aforementioned time difference $\Delta Tt$ by the computed number of control cycles to obtain an amount of time $\Delta Ttx$ by which to increase the future viewing time per control cycle. The vehicle control device then increases the future viewing time Tt using the equation Tt→Tt+$\Delta Ttx$ and proceeds to step S70.

Now the situation of when the value of the lane marker flag CAMLOSTright or CAMLOSTleft from the previous cycle (one control cycle immediately prior) is set to zero (0). If the future viewing time Tt is equal to or larger than Tt0, then the vehicle control device substitutes Tt0 as the value of the future viewing time Tt and proceeds to step S70. It is also acceptable to contrive the vehicle control device to set a counter to a value equal to the number of control cycles corresponding to the restoration time Tf and continue the processing until the counter reaches 0.

Meanwhile, if the future viewing time tt is smaller than Tt0, then the vehicle control device increases the future viewing time Tt using the equation Tt→Tt+$\Delta Ttx$ before proceeding to step S70.

Otherwise, the constituent features of this embodiment are the same as the constituent features of the previously described embodiments.

The start determination suppressing section is configured to gradually lessen suppression of a determination that a control should be started when it determines that a recognition degree at which the lane detecting device detects a lane marker has become normal, thereby restoring the ability to determine that the control should be started. The lower the recognition degree at which the lane detecting device detects a lane marker is before the recognition degree becomes normal, the longer a value to which a restoration time that will be spent to accomplish the restoration is set. In this way, an abrupt change in a threshold value for starting the control can be prevented. As a result, a necessary lateral obstacle avoidance control can be executed while preventing unnecessary starting and ending of the control.

This embodiment presents a method of restoring to a normal state when a determination that a control should be started is suppressed by adjusting a future viewing time Tt, as is done in the first embodiment.

Such a restoration can be accomplished differently when, as in the second embodiment, a determination that a control should be started is suppressed by adjusting an obstacle distance X2obst (i.e., a lane-width direction position measured with respect to a reference lane marker) to a larger value, i.e., by moving the obstacle distance X2obst farther outside in a widthwise direction of a lane from a middle of the lane.

For example, the restoration can accomplished by gradually decreasing a revision coefficient ΔOh to 0 over a period of time equal to a restoration time Tf set according to a recognition degree KD. Thus, a restoration can be accomplished in the same manner as in the embodiment except that the revision coefficient ΔOh is adjusted instead of a future viewing time.

Sixth Embodiment

A sixth embodiment of a vehicle driving control apparatus will now be explained with reference to the drawings. Parts that are the same as those of the previously described embodiments are indicated with the same reference numerals. The constituent features of this embodiment are basically the same as the constituent features of the previously described embodiments. In other words, the host vehicle equipped with this embodiment of the vehicle driving control apparatus has the same construction as seen in FIGS. 1 to 3. However, the method of determining if the lateral obstacle avoidance control should be started is different.

In the first embodiment, a determination of whether or not to start a control is executed in step S90 when an obstacle exists on at least one of the left and right sides of the host vehicle. In the second embodiment, a determination of whether or not to start a control is executed in step S90 regardless of whether an obstacle exists.

In this embodiment, similarly to the first embodiment, in step S90 the vehicle control device determines that the control should be started if an obstacle exists on at least one of the left and right sides of the host vehicle and the equation ΔXb−XO≥X2obst, or ΔXb≥ΔO is satisfied.

Additionally, similar to the second embodiment, when an obstacle exists on neither the left nor right side of the host vehicle, the vehicle control device determines that the control should be started if the equation ΔXb≥X0+X2obst (≥X0) is satisfied.

When an obstacle exists on neither the left nr right side, the obstacle distance X2obst is set to a preset negative value. Also, when an obstacle exists on neither the left nor the right side of the host vehicle, a future viewing time Tt1 that is smaller than the future viewing time Tt0 is used as the default value of the future viewing time Tt. In this way, when an obstacle exists on neither the left nor the right side of the vehicle, the threshold value for determining that the control should be started is closer to the vehicle and the future viewing time Tt1 used as a reference is shorter such that the control starts less readily.

In short, in this embodiment, both a future viewing time Tt0 and a future viewing time Tt1 that is smaller than the future viewing time Tt0 are prepared in advance as default values of the future viewing time Tt.

Otherwise, the constituent features of this embodiment are the same as the constituent features of the previously described embodiments.

A first prescribed amount of time Tt0 and a second prescribed amount of time Tt1 that is shorter than the first prescribed amount of time Tt0 are provided for use as a prescribed amount of time. Furthermore, the first prescribed amount of time Tt0 is set as the prescribed amount of time when an obstacle detecting device detects an obstacle and the second prescribed amount of time Tt1 is set as the prescribed amount of time when the obstacle detecting device does not detect an obstacle. As a result, when an obstacle is detected on a side of the host vehicle, a driving support is executed which gives priority to preventing the host vehicle from approaching the obstacle. Meanwhile, when an obstacle is not detected, a driving support is executed to prevent the host vehicle from departing from the lane in which it is traveling.

The prescribed amount of time used to determine if a control should be started is changed depending on the type of lateral obstacle avoidance control. As a result, an appropriate determination of when to start a lateral obstacle avoidance control can be made in accordance with the targeted type of lateral obstacle avoidance control.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle driving control apparatus comprising:
   a lane detecting device configured to detect a lane marker of a lane in which a host vehicle equipped with the vehicle control apparatus is traveling;
   a future position estimating device configured to estimate a future transverse position of the host vehicle after a prescribed amount of time; and
   a vehicle control device configured to execute a vehicle control with respect to the host vehicle such that a yaw moment oriented toward a middle of the lane in which the host vehicle is traveling is imparted to the host vehicle when the vehicle control device determines that the future transverse position of the host vehicle estimated by the future position estimating device is located laterally farther toward an outside of the lane from the middle of the lane than a prescribed widthwise lane position that is determined in advance using the lane marker as a reference,
   the vehicle control device being further configured to reduce a frequency at which the vehicle control intervenes in influencing lateral movement of the vehicle during occurrence of a decline in a degree at which the lane detecting device is able to recognize the lane marker during the travelling of the host vehicle by suppressing an impartation of the yaw moment by the vehicle control device over a period of time in relation to the traveling of the host vehicle and the decline in the degree at which the lane detecting device is able to recognize the lane marker during the traveling.

2. The vehicle driving control apparatus recited in claim 1, wherein
   the vehicle control device further includes a control start determining section with a start determination suppressing section,
   the control start determining section determines that the vehicle control should be started upon determining that the future transverse position of the host vehicle is located farther toward the outside of the lane from the middle of the lane than the prescribed widthwise lane position, and
   the start determination suppressing section suppresses the impartation of the yaw moment by the vehicle control device by suppressing a determination that the vehicle control should be started.

3. The vehicle driving control apparatus recited in claim 2, further comprising
   an obstacle detecting device configured to detect an obstacle existing laterally of the host vehicle; and
   a steering input detecting device configured to detect a steering input performed by a driver, the future position estimating device being configured to estimate the future transverse position based on the steering input detected by the steering input detecting device,
   the control start determining section determining that the vehicle control should be started when the obstacle detecting device detects the obstacle and the control start determining section determines that the future transverse position of the host vehicle estimated by the future position estimating device is farther in a lateral direction toward the obstacle than is the prescribed widthwise lane position located on a side of the vehicle closer to the obstacle.

4. The vehicle driving control apparatus recited in claim 2, wherein
   the start determination suppressing section suppresses the determination that the vehicle control should be started by shortening the prescribed amount of time used by the future position estimating device to estimate the future transverse position of the host vehicle.

5. The vehicle driving control apparatus recited in claim 2, wherein
   the start determination suppressing section suppresses the determination that the vehicle control should be started by changing the prescribed widthwise lane position laterally farther toward the outside of the lane with respect to the lane marker.

6. The vehicle driving control apparatus recited in claim 2, wherein
   the lane detecting device estimates a position of the lane marker based on information obtained when the lane marker was previously detected, when the lane detecting device cannot detect the lane marker, and
   the control start determining section determines if the vehicle control should be started based on the lane marker that is estimated when the lane detecting device cannot detect a lane marker.

7. The vehicle driving control apparatus recited in claim 6, wherein
   the start determination suppressing section suppresses the determination that the vehicle control should be started so that the determination that the vehicle control should be started occurs later as an amount of time that the lane marker continues to be undetectable becomes longer.

8. The vehicle driving control apparatus recited in claim 2, wherein
   the start determination suppressing section suppress the determination that the vehicle control should be started so that the determination that the vehicle control should be started occurs later as a host vehicle speed becomes lower, when the degree at which the ability to recognize the lane marker becomes lower than a prescribed value.

9. The vehicle driving control apparatus recited in claim 2, wherein
   the future position estimating section estimates the future transverse position of the host vehicle after the prescribed amount of time by using a steering quantity that includes a steering angle component and a steering velocity component, and
   the start determination suppressing section suppresses the determination that the vehicle control should be started by increasing the steering angle component with respect to the steering velocity component.

10. The vehicle driving control apparatus recited in claim 2, wherein
    the vehicle control device increases a control gain of a control quantity used to control the host vehicle such that the yaw moment is imparted to the host vehicle when the start determination suppressing section is suppressing the determination by the control start determining section that the vehicle control should be started.

11. The vehicle driving control apparatus recited in claim 2, wherein
the start determination suppressing section gradually restores a suppression quantity used for suppressing the determination that the vehicle control should be started upon determining that the degree at which the ability of the lane detecting device to detect the lane marker has become equal to or larger than a prescribed value, and
a restoration time to accomplish restoration of the suppression quantity is set longer as the degree at which the ability of the lane detecting device to detect the lane marker becomes lower, before the degree becomes equal to or larger than a prescribed value.

12. The vehicle driving control apparatus recited in claim 2, further comprising:
an obstacle detecting device configured to detect an obstacle existing laterally of the host vehicle,
the future position estimating device setting a first prescribed amount of time as the prescribed amount of time used for estimating the future transverse position of the host vehicle when the obstacle detecting device detects the obstacle, and
the future position estimating device setting a second prescribed amount of time, which is shorter than the first prescribed amount of time, as the prescribed amount of time used for estimating the future transverse position of the host vehicle when the obstacle detecting device is not detecting the obstacle.

13. A vehicle driving control method comprising:
detecting an obstacle laterally of a host vehicle employing the vehicle driving control method;
estimating a future transverse position of the host vehicle after a prescribed amount of time based on a steering input performed by a driver;
controlling a yaw moment imparted on the host vehicle with the yaw moment being oriented toward a middle of a lane in which the host vehicle is traveling upon determining that the future transverse position of the host vehicle is positioned farther in a lateral direction toward the obstacle than a prescribed widthwise lane position that is determined in advance using a lane marker located on a side of the vehicle closer to the obstacle as a reference; and
suppressing control of the yaw moment imparted on the host vehicle over a period of time in relation to the traveling of the host vehicle and a decline in an ability to recognize the lane marker on the side of the vehicle closer to the obstacle during the traveling by reducing a frequency at which the yaw moment is imparted on the host vehicle over a period of time in relation to the traveling of the host vehicle and the decline in the ability to recognize the lane marker during the traveling.

14. A vehicle driving control method comprising:
estimating a future transverse position of a host vehicle employing the vehicle driving control method after a prescribed amount of time;
executing vehicle control to impart a yaw moment on the host vehicle with the yaw moment being oriented toward a middle of a lane in which the host vehicle is traveling upon determining that the future transverse position of the host vehicle is positioned farther toward an outside of the lane from the middle of the lane than a prescribed widthwise lane position that is determined in advance using a lane marker as a reference; and suppressing impartation of the yaw moment by the vehicle control over a period of time in relation to the traveling of the host vehicle and a decline in an ability to recognize the lane marker during the traveling by reducing a frequency at which the yaw moment is imparted on the host vehicle over the period of time in relation to the traveling of the host vehicle and the decline in the ability to recognize the lane marker during the traveling.

15. A vehicle driving control apparatus comprising:
a lane detecting device configured to detect a lane marker of a lane in which a host vehicle equipped with the vehicle control apparatus is traveling;
a future position estimating device configured to estimate a future transverse position of the host vehicle after a prescribed amount of time; and
a vehicle control device configured to execute a vehicle control with respect to the host vehicle such that a yaw moment oriented toward a middle of the lane in which the host vehicle is traveling is imparted to the host vehicle when the vehicle control device determines that the future transverse position of the host vehicle estimated by the future position estimating device is located laterally farther toward an outside of the lane from the middle of the lane than a prescribed widthwise lane position that is determined in advance using the lane marker as a reference,
the vehicle control device being further configured to suppress an impartation of the yaw moment by the vehicle control device when a recognition degree at which the lane detecting device detects the lane marker is lower than a prescribed value, the vehicle control device further including a control start determining section with a start determination suppressing section,
the control start determining section determining that the vehicle control should be started upon determining that the future transverse position of the host vehicle is located farther toward the outside of the lane from the middle of the lane than the prescribed widthwise lane position,
the start determination suppressing section suppressing the impartation of the yaw moment by the vehicle control device by suppressing a determination that the vehicle control should be started, and the start determination suppressing section gradually restoring a suppression quantity used for suppressing the determination that the vehicle control should be started upon determining that the recognition degree at which the lane detecting device detects the lane marker has become equal to or larger than the prescribed value, and
a restoration time to accomplish restoration of the suppression quantity is set longer as the recognition degree at which the lane detecting device detects the lane marker becomes lower, before the recognition degree becomes become equal to or larger than the prescribed value.

16. The vehicle driving control apparatus recited in claim 1, wherein
the vehicle control device is further configured suppress the impartation of the yaw moment by making a prescribed amount of time to delay the impartation of the yaw moment shorter in accordance with the decline in the degree at which the lane detecting device is able to recognize the lane marker during the travelling.

17. The vehicle driving control method recited in claim 13, wherein
the suppressing control of the yaw moment imparted on the host vehicle includes making a prescribed amount of time to delay the impartation of the yaw moment shorter in accordance with the decline in the ability to recognize the lane marker during the travelling.

18. The vehicle driving control method recited in claim 14, wherein the suppressing impartation of the yaw moment on the host vehicle includes making a prescribed amount of time to delay the impartation of the yaw moment shorter in accordance with the decline in the ability to recognize the lane marker during the travelling.

19. The vehicle driving control apparatus recited in claim 15, wherein the start determination suppressing section suppresses the impartation of the yaw moment by making a prescribed amount of time to delay the impartation of the yaw moment shorter in accordance with the decline in the recognition degree during the travelling.

* * * * *